(12) United States Patent
Harris et al.

(10) Patent No.: US 11,263,640 B2
(45) Date of Patent: Mar. 1, 2022

(54) CLOUD SERVICE FACILITATOR APPARATUSES, METHODS AND SYSTEMS

(71) Applicant: VISA INTERNATIONAL SERVICE ASSOCIATION, San Francisco, CA (US)

(72) Inventors: Theodore David Harris, San Francisco, CA (US); Patrick Faith, Pleasanton, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 371 days.

(21) Appl. No.: 15/976,605

(22) Filed: May 10, 2018

(65) Prior Publication Data

US 2018/0293589 A1 Oct. 11, 2018

Related U.S. Application Data

(63) Continuation of application No. 13/411,499, filed on Mar. 2, 2012, now Pat. No. 9,996,838.

(60) Provisional application No. 61/449,575, filed on Mar. 4, 2011.

(51) Int. Cl.
*G06Q 30/00* (2012.01)
*G06Q 20/12* (2012.01)

(52) U.S. Cl.
CPC .......... *G06Q 30/016* (2013.01); *G06Q 20/12* (2013.01)

(58) Field of Classification Search
CPC .............................. G06Q 30/06; G06Q 20/12
USPC .............................................................. 705/4
See application file for complete search history.

(56) References Cited

U.S. PATENT DOCUMENTS

| 789,106 A | 5/1905 | Seymour |
| 5,237,164 A | 8/1993 | Takada |
| 5,311,594 A | 5/1994 | Penzias |
| 5,446,890 A | 8/1995 | Renslo |

(Continued)

FOREIGN PATENT DOCUMENTS

| EP | 0855659 A1 | 7/1998 |
| JP | 2008545210 A | 12/2008 |

(Continued)

OTHER PUBLICATIONS

"Verizon Wirelss to Pay Millions in Refunds", NY times Oct. 3, 2010 (Year: 2010).*

(Continued)

*Primary Examiner* — Bruce I Ebersman
(74) *Attorney, Agent, or Firm* — Loeb & Loeb LLP

(57) ABSTRACT

The CLOUD SERVICE FACILITATOR APPARATUSES, METHODS AND SYSTEMS ("CSF") transforms user purchase requests, refund requests, and product/service replacement requests via CSF components into transaction records, refunds, and replacement products/services outputs. The CSF may receive a consumer purchase request for a cloud service from a merchant. In response to the request, the CSF may generate a unique record key for the purchase and may transmit the unique record key to the merchant. The CSF may further receive additional transaction information and the unique record key from the merchant. In response to the received information and the unique key, the CSF may provide additional service to the merchant or the consumer.

16 Claims, 17 Drawing Sheets

(56) References Cited

U.S. PATENT DOCUMENTS

| | | |
|---|---|---|
| 5,459,656 A | 10/1995 | Fields |
| 5,510,777 A | 4/1996 | Pilc |
| 5,521,362 A | 5/1996 | Powers |
| 5,530,438 A | 6/1996 | Bickham |
| 5,536,045 A | 7/1996 | Adams |
| 5,615,110 A | 3/1997 | Wong |
| 5,615,264 A | 3/1997 | Kazmierczak |
| 5,649,118 A | 7/1997 | Carlisle |
| 5,815,657 A | 9/1998 | Williams |
| 5,850,446 A | 12/1998 | Berger |
| 5,878,337 A | 3/1999 | Joao |
| 5,903,830 A | 5/1999 | Joao |
| 5,943,624 A | 8/1999 | Fox |
| 5,963,924 A | 10/1999 | Williams |
| 6,064,990 A | 5/2000 | Goldsmith |
| 6,092,053 A | 7/2000 | Boesch |
| 6,202,052 B1 | 3/2001 | Miller |
| 6,202,933 B1 | 3/2001 | Poore |
| 6,263,447 B1 | 7/2001 | French |
| 6,267,292 B1 | 7/2001 | Walker |
| 6,336,099 B1 | 1/2002 | Barnett |
| 6,473,500 B1 | 10/2002 | Risafi |
| 6,529,725 B1 | 3/2003 | Joao |
| 6,535,855 B1 | 3/2003 | Cahill |
| 6,601,761 B1 | 8/2003 | Katis |
| 6,735,572 B2 | 5/2004 | Landesmann |
| 6,853,982 B2 | 2/2005 | Smith |
| 6,857,073 B2 | 2/2005 | French |
| 6,873,974 B1 | 3/2005 | Schutzer |
| 6,898,598 B2 | 5/2005 | Himmel |
| 6,934,528 B2 | 8/2005 | Loureiro |
| 6,999,943 B1 | 2/2006 | Johnson |
| 7,024,383 B1 | 4/2006 | Mancini |
| 7,028,052 B2 | 4/2006 | Chapman |
| 7,047,041 B2 | 5/2006 | Vanska |
| 7,051,002 B2 | 5/2006 | Keresman, III |
| 7,080,208 B2 | 8/2006 | Levchin |
| 7,096,003 B2 | 8/2006 | Joao |
| 7,111,789 B2 | 9/2006 | Rajasekaran |
| 7,155,411 B1 | 12/2006 | Blinn |
| 7,177,848 B2 | 2/2007 | Hogan |
| 7,194,427 B1 * | 3/2007 | Van Horn ............... G06Q 30/00 |
| | | 705/26.2 |
| 7,194,437 B1 | 3/2007 | Britto |
| 7,206,847 B1 | 4/2007 | Alberth |
| 7,212,979 B1 | 5/2007 | Matz |
| RE39,736 E | 7/2007 | Morrill |
| 7,268,667 B2 | 9/2007 | Beenau |
| 7,268,668 B2 | 9/2007 | Beenau |
| 7,290,704 B1 | 11/2007 | Ball |
| 7,318,049 B2 | 1/2008 | Iannacci |
| 7,337,119 B1 | 2/2008 | Geschwender |
| 7,337,144 B1 | 2/2008 | Blinn |
| 7,343,149 B2 | 3/2008 | Benco |
| 7,343,351 B1 | 3/2008 | Bishop |
| 7,349,885 B2 | 3/2008 | Gangi |
| 7,356,505 B2 | 4/2008 | March |
| 7,357,310 B2 | 4/2008 | Calabrese |
| 7,359,880 B2 | 4/2008 | Abel |
| 7,373,669 B2 | 5/2008 | Eisen |
| 7,379,899 B1 * | 5/2008 | Junger ................. G06Q 20/203 |
| | | 235/385 |
| 7,392,222 B1 | 6/2008 | Hamilton |
| 7,395,242 B2 | 7/2008 | Blinn |
| 7,398,250 B2 | 7/2008 | Blinn |
| 7,413,113 B1 | 8/2008 | Zhu |
| 7,450,966 B2 | 11/2008 | Vanska |
| 7,477,780 B2 | 1/2009 | Boncyk |
| 7,499,889 B2 | 3/2009 | Golan |
| 7,500,607 B2 | 3/2009 | Williams |
| 7,533,064 B1 | 5/2009 | Boesch |
| 7,536,360 B2 | 5/2009 | Stolfo |
| 7,571,139 B1 | 8/2009 | Giordano |
| 7,571,140 B2 | 8/2009 | Weichert |
| 7,593,858 B2 | 9/2009 | Matz |
| 7,603,311 B1 | 10/2009 | Yadav-ranjan |
| 7,630,937 B1 | 12/2009 | Mo |
| 7,634,295 B2 | 12/2009 | Hayaashi |
| 7,644,037 B1 | 1/2010 | Ostrovsky |
| 7,644,859 B1 | 1/2010 | Zhu |
| 7,660,749 B2 | 2/2010 | Koski |
| 7,676,434 B2 | 3/2010 | Evans |
| 7,685,067 B1 | 3/2010 | Britto |
| 7,698,221 B2 | 4/2010 | Blinn |
| 7,707,113 B1 | 4/2010 | Dimartino |
| 7,708,194 B2 | 5/2010 | Vawter |
| 7,708,198 B2 | 5/2010 | Gangi |
| 7,712,658 B2 | 5/2010 | Gangi |
| 7,720,708 B1 * | 5/2010 | Elkins, II ............ G06Q 30/0207 |
| | | 705/14.23 |
| 7,739,194 B2 | 6/2010 | Blinn |
| 7,742,984 B2 | 6/2010 | Mohsenzadeh |
| 7,774,076 B2 | 8/2010 | Skowronek |
| 7,783,569 B2 | 8/2010 | Abel |
| 7,784,684 B2 | 8/2010 | Labrou |
| 7,801,829 B2 | 9/2010 | Gray |
| 7,802,719 B2 | 9/2010 | Johnson |
| 7,810,720 B2 | 10/2010 | Lovett |
| 7,819,307 B2 | 10/2010 | Lyons |
| 7,828,206 B2 | 11/2010 | Hessburg |
| 7,828,992 B2 | 11/2010 | Kilickiran |
| 7,837,125 B2 | 11/2010 | Biskupski |
| 7,844,530 B2 | 11/2010 | Ziade |
| 7,849,014 B2 | 12/2010 | Erikson |
| 7,870,027 B1 | 1/2011 | Tannenbaum |
| 7,877,299 B2 | 1/2011 | Bui |
| 7,878,400 B2 | 2/2011 | Harris |
| 7,890,370 B2 | 2/2011 | Whitsitt |
| 7,895,119 B2 | 2/2011 | Praisner |
| 7,899,744 B2 | 3/2011 | Bishop |
| 7,904,360 B2 | 3/2011 | Evans |
| 7,908,227 B2 | 3/2011 | Zizzimopoulos |
| 7,926,714 B1 | 4/2011 | Zhu |
| 7,933,779 B2 | 4/2011 | Rooks |
| 7,942,337 B2 | 5/2011 | Jain |
| 7,962,418 B1 | 6/2011 | Wei |
| 7,967,196 B1 | 6/2011 | Bierbaum |
| 7,971,782 B1 | 7/2011 | Shams |
| 7,996,259 B1 | 8/2011 | Distefano, III |
| 8,016,192 B2 | 9/2011 | Messerges |
| 8,020,763 B1 | 9/2011 | Kowalchyk |
| 8,024,260 B1 | 9/2011 | Hogl |
| 8,028,041 B2 | 9/2011 | Olliphant |
| 8,032,438 B1 | 10/2011 | Barton |
| 8,041,338 B2 | 10/2011 | Chen |
| 8,050,997 B1 | 11/2011 | Nosek |
| 8,060,413 B2 | 11/2011 | Castell |
| 8,065,179 B1 * | 11/2011 | Karnik ................. G06Q 10/107 |
| | | 705/7.35 |
| 8,074,876 B2 | 12/2011 | Foss |
| 8,095,471 B2 * | 1/2012 | Yang ....................... G06F 21/10 |
| | | 705/59 |
| 8,108,261 B2 | 1/2012 | Carlier |
| 8,127,982 B1 | 3/2012 | Casey |
| 8,140,418 B1 | 3/2012 | Casey |
| 8,145,188 B2 | 3/2012 | Park |
| 8,145,561 B1 | 3/2012 | Zhu |
| 8,145,566 B1 | 3/2012 | Ahuja |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar |
| 8,151,328 B1 | 4/2012 | Lundy |
| 8,151,330 B2 | 4/2012 | Vishik |
| 8,151,336 B2 | 4/2012 | Savoor |
| 8,155,999 B2 | 4/2012 | De Boer |
| 8,156,000 B1 | 4/2012 | Thompson |
| 8,156,026 B2 * | 4/2012 | Junger ............... G06Q 10/0833 |
| | | 705/35 |
| 8,156,042 B2 | 4/2012 | Winkleman, III |
| 8,156,549 B2 | 4/2012 | Rice |
| 8,157,178 B2 | 4/2012 | Dewan |
| 8,157,181 B2 | 4/2012 | Bates |
| 8,160,935 B2 | 4/2012 | Bui |

(56) References Cited

U.S. PATENT DOCUMENTS

| | | |
|---|---|---|
| 8,160,959 B2 | 4/2012 | Rackley, III |
| 8,165,961 B1 | 4/2012 | Dimartino |
| 8,166,068 B2 | 4/2012 | Stevens |
| RE43,351 E | 5/2012 | Jordan |
| 8,170,921 B2 | 5/2012 | Stocker |
| 8,175,235 B2 | 5/2012 | Mumford |
| 8,175,965 B2 | 5/2012 | Moore |
| 8,175,967 B2 | 5/2012 | OLeary |
| 8,175,968 B2 | 5/2012 | OLeary |
| 8,175,975 B2 | 5/2012 | Cai |
| 8,175,979 B2 | 5/2012 | Baentsch |
| 8,176,416 B1 | 5/2012 | Williams |
| 8,179,563 B2 | 5/2012 | King |
| 8,180,289 B1 | 5/2012 | Glickman |
| 8,180,705 B2 | 5/2012 | Kowalchyk |
| 8,190,513 B2 | 5/2012 | Felger |
| 8,191,775 B2 | 6/2012 | Hildred |
| 8,195,233 B2 | 6/2012 | Morikuni |
| 8,195,544 B2 | 6/2012 | Horsfall |
| 8,195,547 B2 | 6/2012 | Aaltonen |
| 8,195,565 B2 | 6/2012 | Bishop |
| 8,195,576 B1 | 6/2012 | Grigg |
| 8,196,131 B1 | 6/2012 | Von Behren |
| 8,200,582 B1 | 6/2012 | Zhu |
| 8,204,774 B2 | 6/2012 | Chwast |
| 8,204,829 B2 | 6/2012 | Alvarez |
| 8,209,245 B2 | 6/2012 | Dennes |
| 8,209,744 B2 | 6/2012 | Zhu |
| 8,214,288 B2 | 7/2012 | Olliphant |
| 8,214,289 B2 | 7/2012 | Scipioni |
| 8,214,291 B2 | 7/2012 | Pelegero |
| 8,214,292 B2 | 7/2012 | Duggal |
| 8,214,293 B2 | 7/2012 | Powell |
| 8,214,886 B2 | 7/2012 | Foley |
| 8,215,546 B2 | 7/2012 | Lin |
| 8,219,411 B2 | 7/2012 | Matz |
| 8,219,474 B2 | 7/2012 | Sutton |
| 8,219,490 B2 | 7/2012 | Hammad |
| 8,220,047 B1 | 7/2012 | Soghoian |
| 8,224,702 B2 | 7/2012 | Mangerink |
| 8,224,754 B2 | 7/2012 | Pastusiak |
| 8,224,773 B2 | 7/2012 | Spiegel |
| 8,225,997 B1 | 7/2012 | Bierbaum |
| 8,227,936 B1 | 7/2012 | Folk |
| 8,229,354 B2 | 7/2012 | Sklovsky |
| 8,229,808 B1 | 7/2012 | Heit |
| 8,229,844 B2 | 7/2012 | Felger |
| 8,229,851 B2 | 7/2012 | Doran |
| 8,229,854 B2 | 7/2012 | Stephen |
| 8,233,841 B2 | 7/2012 | Griffin |
| 8,234,183 B2 | 7/2012 | Smith |
| 8,239,276 B2 | 8/2012 | Lin |
| 8,244,580 B2 | 8/2012 | Mankoff |
| 8,249,965 B2 | 8/2012 | Tumminaro |
| 8,255,278 B1 | 8/2012 | Young |
| 8,255,323 B1 | 8/2012 | Casey |
| 8,255,324 B2 | 8/2012 | Bercy |
| 8,275,704 B2 | 9/2012 | Bishop |
| 8,280,777 B2 | 10/2012 | Mengerink |
| 8,281,998 B2 | 10/2012 | Tang |
| 8,282,002 B2 | 10/2012 | Shams |
| 8,285,640 B2 | 10/2012 | Scipioni |
| 8,285,820 B2 | 10/2012 | Olliphant |
| 8,285,832 B2 | 10/2012 | Schwab |
| 8,286,875 B2 | 10/2012 | Tang |
| 8,290,433 B2 | 10/2012 | Fisher |
| 8,290,819 B2 | 10/2012 | Bawcutt |
| 8,290,829 B1 | 10/2012 | Katz |
| 8,295,898 B2 | 10/2012 | Ashfield |
| 8,296,187 B2 | 10/2012 | Light |
| 8,296,204 B2 | 10/2012 | Templeton |
| 8,296,228 B1 | 10/2012 | Kloor |
| 8,296,231 B2 | 10/2012 | Britto |
| 8,301,500 B2 | 10/2012 | Pharris |
| 8,301,510 B2 | 10/2012 | Boesch |
| 8,301,556 B2 | 10/2012 | Hogl |
| 8,311,520 B2 | 11/2012 | Choi |
| 8,312,096 B2 | 11/2012 | Cohen |
| 8,321,267 B2 | 11/2012 | Hoerenz |
| 8,321,294 B2 | 11/2012 | Carlier |
| 8,321,315 B2 | 11/2012 | Abel |
| 8,321,338 B2 | 11/2012 | Baumgart |
| 8,321,343 B2 | 11/2012 | Ramavarjula |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement |
| 8,332,272 B2 | 12/2012 | Fisher |
| 8,332,275 B2 | 12/2012 | Poon |
| 8,332,323 B2 | 12/2012 | Stals |
| 8,335,720 B2 | 12/2012 | Juang |
| 8,335,726 B1 | 12/2012 | Ling |
| 8,335,822 B2 | 12/2012 | Ahmed |
| 8,335,921 B2 | 12/2012 | Von Behren |
| 8,335,932 B2 | 12/2012 | Von Behren |
| 8,340,666 B2 | 12/2012 | Ramer |
| 8,341,029 B1 | 12/2012 | Ramalingam |
| 8,346,643 B2 | 1/2013 | Boyer |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat |
| 8,352,749 B2 | 1/2013 | Von Behren |
| 8,355,987 B2 | 1/2013 | Hirson |
| 8,359,070 B1 | 1/2013 | Zhu |
| 8,364,587 B2 | 1/2013 | Nuzum |
| 8,364,590 B1 | 1/2013 | Casey |
| 8,370,264 B1 | 2/2013 | Wei |
| 8,380,177 B2 | 2/2013 | Laracey |
| 8,401,904 B1 | 3/2013 | Simakov |
| 8,412,586 B1 | 4/2013 | Foulser |
| 8,412,630 B2 | 4/2013 | Ross |
| 8,417,633 B1 | 4/2013 | Chmara |
| 8,423,462 B1 | 4/2013 | Amacker |
| 2001/0037297 A1 | 3/2001 | McNair |
| 2001/0056359 A1 | 12/2001 | Abreu |
| 2002/0040325 A1 | 4/2002 | Takae |
| 2002/0077976 A1 | 6/2002 | Meyer |
| 2002/0107755 A1 | 8/2002 | Steed |
| 2002/0112014 A1 | 8/2002 | Bennett |
| 2002/0116271 A1 | 8/2002 | Mankoff |
| 2002/0143614 A1 | 10/2002 | MacLean |
| 2003/0014307 A1 | 1/2003 | Heng |
| 2003/0026404 A1 | 2/2003 | Joyce |
| 2003/0028481 A1 | 2/2003 | Flitcroft |
| 2003/0080185 A1 | 5/2003 | Werther |
| 2003/0097318 A1 | 5/2003 | Yu |
| 2003/0101134 A1 | 5/2003 | Liu |
| 2003/0174823 A1 | 9/2003 | Justice |
| 2003/0177361 A1 | 9/2003 | Wheeler |
| 2003/0191711 A1 | 10/2003 | Jamison |
| 2003/0200142 A1 | 10/2003 | Hicks |
| 2003/0200184 A1 | 10/2003 | Dominguez |
| 2003/0212642 A1 | 11/2003 | Weller |
| 2004/0078332 A1 | 4/2004 | Ferguson |
| 2004/0103037 A1 | 5/2004 | Wetmore |
| 2004/0128197 A1 | 7/2004 | Bam |
| 2004/0138999 A1 | 7/2004 | Friedman |
| 2004/0148255 A1 | 7/2004 | Beck |
| 2004/0215963 A1 | 10/2004 | Kaplan |
| 2004/0230536 A1 | 11/2004 | Fung |
| 2004/0236646 A1 | 11/2004 | Wu |
| 2004/0254891 A1 | 12/2004 | Blinn |
| 2004/0267608 A1 | 12/2004 | Mansfield |
| 2005/0010483 A1 | 1/2005 | Ling |
| 2005/0037735 A1 | 2/2005 | Courts |
| 2005/0065819 A1 | 3/2005 | Pamela |
| 2005/0080747 A1 | 4/2005 | Anderson |
| 2005/0080821 A1 | 4/2005 | Breil |
| 2005/0097320 A1 | 5/2005 | Golan |
| 2005/0137969 A1 | 6/2005 | Shah |
| 2005/0171894 A1 | 8/2005 | Traynor |
| 2005/0192893 A1 | 9/2005 | Keeling |

(56) References Cited

U.S. PATENT DOCUMENTS

| | | |
|---|---|---|
| 2005/0192895 A1 | 9/2005 | Rogers |
| 2005/0220326 A1 | 10/2005 | Sim |
| 2005/0234817 A1 | 10/2005 | VanFleet |
| 2005/0246278 A1 | 11/2005 | Gerber et al. |
| 2005/0254714 A1 | 11/2005 | Anne |
| 2005/0261967 A1 | 11/2005 | Barry |
| 2006/0053056 A1 | 3/2006 | Alspach-goss |
| 2006/0085328 A1 | 4/2006 | Cohen |
| 2006/0085477 A1 | 4/2006 | Phillips |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano |
| 2006/0190347 A1 | 8/2006 | Cuervo |
| 2006/0226216 A1 | 10/2006 | Keithley |
| 2006/0229896 A1* | 10/2006 | Rosen ............... G06Q 10/1053 705/321 |
| 2006/0277143 A1 | 12/2006 | Almonte |
| 2006/0293947 A1 | 12/2006 | Nicholson |
| 2007/0011025 A1 | 1/2007 | Cracchiolo |
| 2007/0038515 A1 | 2/2007 | Postrel |
| 2007/0038516 A1 | 2/2007 | Apple |
| 2007/0055571 A1 | 3/2007 | Fox |
| 2007/0087820 A1 | 4/2007 | Van |
| 2007/0094066 A1 | 4/2007 | Kumar |
| 2007/0100691 A1 | 5/2007 | Patterson |
| 2007/0100728 A1 | 5/2007 | Rotman |
| 2007/0106607 A1 | 5/2007 | Seib |
| 2007/0113289 A1 | 5/2007 | Blumenau |
| 2007/0143204 A1 | 6/2007 | Claus |
| 2007/0150413 A1 | 6/2007 | Morgenstern |
| 2007/0180119 A1 | 8/2007 | Khivesara |
| 2007/0208662 A1 | 9/2007 | Jeronimus |
| 2007/0214078 A1 | 9/2007 | Coppinger |
| 2007/0214250 A1 | 9/2007 | Ahmed |
| 2007/0226152 A1 | 9/2007 | Jones |
| 2007/0233590 A1 | 10/2007 | Hardison |
| 2007/0239502 A1 | 10/2007 | Babu |
| 2007/0276765 A1 | 11/2007 | Hazel |
| 2008/0004116 A1 | 1/2008 | Van |
| 2008/0004952 A1 | 1/2008 | Koli |
| 2008/0004981 A1* | 1/2008 | Gopalpur ........... G06Q 30/0635 705/26.81 |
| 2008/0010096 A1 | 1/2008 | Patterson |
| 2008/0021829 A1 | 1/2008 | Kranzley |
| 2008/0077489 A1 | 3/2008 | Gilley |
| 2008/0077505 A1* | 3/2008 | Ilechko ................ G06Q 10/02 705/5 |
| 2008/0086365 A1 | 4/2008 | Zollino |
| 2008/0091553 A1 | 4/2008 | Koski |
| 2008/0091616 A1 | 4/2008 | Helwin |
| 2008/0097856 A1 | 4/2008 | Blagg |
| 2008/0103967 A1 | 5/2008 | Ackert |
| 2008/0114737 A1 | 5/2008 | Neely |
| 2008/0126145 A1 | 5/2008 | Racklet, III |
| 2008/0133351 A1 | 6/2008 | White |
| 2008/0140568 A1 | 6/2008 | Henry |
| 2008/0147883 A1 | 6/2008 | Philyaw |
| 2008/0162361 A1 | 7/2008 | Sklovsky |
| 2008/0167965 A1 | 7/2008 | Von |
| 2008/0172274 A1 | 7/2008 | Hurowitz |
| 2008/0172331 A1 | 7/2008 | Graves |
| 2008/0177574 A1 | 7/2008 | Marcos |
| 2008/0177672 A1 | 7/2008 | Brunner |
| 2008/0223918 A1 | 9/2008 | Williams |
| 2008/0270300 A1 | 10/2008 | Jones |
| 2008/0272188 A1 | 11/2008 | Keithley |
| 2008/0319905 A1 | 12/2008 | Carlson |
| 2009/0006181 A1 | 1/2009 | Ghosh |
| 2009/0009392 A1* | 1/2009 | Jacomb-Hood ......... H01Q 3/24 342/374 |
| 2009/0024527 A1 | 1/2009 | Sellen |
| 2009/0037255 A1 | 2/2009 | Chiu |
| 2009/0048934 A1 | 2/2009 | Haddad |
| 2009/0061884 A1 | 3/2009 | Rajan |
| 2009/0063261 A1 | 3/2009 | Scribner |
| 2009/0064056 A1 | 3/2009 | Anderson |
| 2009/0076953 A1 | 3/2009 | Saville |
| 2009/0076966 A1 | 3/2009 | Bishop |
| 2009/0089176 A1 | 4/2009 | Mccabe |
| 2009/0089193 A1 | 4/2009 | Paintin |
| 2009/0104888 A1 | 4/2009 | Cox |
| 2009/0106151 A1 | 4/2009 | Nelsen |
| 2009/0119176 A1 | 5/2009 | Johnson |
| 2009/0119211 A1 | 5/2009 | Johnson |
| 2009/0132347 A1 | 5/2009 | Anderson |
| 2009/0132395 A1 | 5/2009 | Lam |
| 2009/0144104 A1 | 6/2009 | Johnson |
| 2009/0164344 A1 | 6/2009 | Shiftan |
| 2009/0171778 A1 | 7/2009 | Powell |
| 2009/0182664 A1 | 7/2009 | Trombley |
| 2009/0210300 A1 | 8/2009 | Cansler |
| 2009/0222347 A1 | 9/2009 | Whitten |
| 2009/0233579 A1 | 9/2009 | Castell |
| 2009/0234751 A1 | 9/2009 | Chan |
| 2009/0241159 A1 | 9/2009 | Campagna |
| 2009/0254471 A1 | 10/2009 | Seidel |
| 2009/0254479 A1 | 10/2009 | Pharris |
| 2009/0254535 A1 | 10/2009 | Eickelmann |
| 2009/0265274 A1 | 10/2009 | Hahn-Carlson |
| 2009/0271265 A1 | 10/2009 | Lay |
| 2009/0288012 A1 | 11/2009 | Hertel |
| 2009/0307135 A1* | 12/2009 | Gupta ................ G06Q 30/0601 705/44 |
| 2009/0313132 A1 | 12/2009 | McKenna |
| 2009/0327045 A1 | 12/2009 | Olives |
| 2009/0327088 A1 | 12/2009 | Puthupparambil |
| 2010/0004989 A1 | 1/2010 | Bonalle |
| 2010/0005025 A1 | 1/2010 | Kumar |
| 2010/0009663 A1 | 1/2010 | Chang |
| 2010/0010964 A1 | 1/2010 | Skowronek |
| 2010/0023386 A1 | 1/2010 | Avisar |
| 2010/0023455 A1 | 1/2010 | Dispensa |
| 2010/0036741 A1 | 2/2010 | Cleven |
| 2010/0036775 A1 | 2/2010 | Edens |
| 2010/0042456 A1 | 2/2010 | Stinchcombe |
| 2010/0042537 A1 | 2/2010 | Smith |
| 2010/0042540 A1 | 2/2010 | Graves |
| 2010/0049879 A1 | 2/2010 | Leavitt |
| 2010/0063903 A1 | 3/2010 | Whipple |
| 2010/0076873 A1* | 3/2010 | Taylor ................... G06Q 40/02 705/30 |
| 2010/0078471 A1 | 4/2010 | Lin |
| 2010/0078472 A1 | 4/2010 | Lin |
| 2010/0082444 A1 | 4/2010 | Lin |
| 2010/0082445 A1 | 4/2010 | Hodge |
| 2010/0082447 A1 | 4/2010 | Lin |
| 2010/0082455 A1 | 4/2010 | Rosenblatt |
| 2010/0082456 A1* | 4/2010 | Chung ............... G06Q 30/0601 705/26.1 |
| 2010/0082480 A1 | 4/2010 | Korosec |
| 2010/0082481 A1 | 4/2010 | Lin |
| 2010/0082485 A1 | 4/2010 | Lin |
| 2010/0082490 A1 | 4/2010 | Rosenblatt |
| 2010/0082491 A1 | 4/2010 | Rosenblatt |
| 2010/0088188 A1 | 4/2010 | Kumar |
| 2010/0094730 A1 | 4/2010 | Koski |
| 2010/0100480 A1 | 4/2010 | Altman |
| 2010/0121707 A1 | 5/2010 | Goeldi |
| 2010/0125492 A1 | 5/2010 | Lin |
| 2010/0125495 A1 | 5/2010 | Smith |
| 2010/0125803 A1 | 5/2010 | Johnson |
| 2010/0131347 A1 | 5/2010 | Sarptipi |
| 2010/0131415 A1 | 5/2010 | Sartipi |
| 2010/0155470 A1 | 6/2010 | Woronec |
| 2010/0161433 A1 | 6/2010 | White |
| 2010/0174599 A1 | 7/2010 | Rosenblatt |
| 2010/0185505 A1 | 7/2010 | Sprogoe |
| 2010/0185531 A1 | 7/2010 | Van |
| 2010/0191578 A1 | 7/2010 | Tran |
| 2010/0191622 A1 | 7/2010 | Reiss |
| 2010/0191770 A1 | 7/2010 | Cho |
| 2010/0198626 A1 | 8/2010 | Cho |
| 2010/0211445 A1 | 8/2010 | Bodington |

(56) References Cited

U.S. PATENT DOCUMENTS

| | | |
|---|---|---|
| 2010/0211452 A1 | 8/2010 | D |
| 2010/0211499 A1 | 8/2010 | Zanzot |
| 2010/0217682 A1 | 8/2010 | Chan |
| 2010/0250351 A1 | 9/2010 | Gillenson |
| 2010/0276484 A1 | 11/2010 | Banerjee |
| 2010/0305848 A1 | 12/2010 | Stallman |
| 2010/0306075 A1 | 12/2010 | Drance |
| 2010/0306113 A1 | 12/2010 | Grey |
| 2010/0312645 A1 | 12/2010 | Niekadlik |
| 2010/0312676 A1 | 12/2010 | Muthukumaran |
| 2010/0332262 A1 | 12/2010 | Horvitz |
| 2010/0332283 A1 | 12/2010 | Ng |
| 2011/0047075 A1 | 2/2011 | Fourez |
| 2011/0078082 A1 | 3/2011 | Gupta |
| 2011/0082789 A1 | 4/2011 | Boyd |
| 2011/0099057 A1 | 4/2011 | Tenyer |
| 2011/0105183 A1 | 5/2011 | Hsiao |
| 2011/0106698 A1 | 5/2011 | Issacson |
| 2011/0137742 A1 | 6/2011 | Parikh |
| 2011/0178896 A1 | 7/2011 | Nakajima |
| 2011/0184827 A1 | 7/2011 | Hubert |
| 2011/0215146 A1 | 9/2011 | Shams |
| 2011/0218870 A1 | 9/2011 | Shams |
| 2011/0231280 A1* | 9/2011 | Farah .................. G06Q 30/04 705/26.8 |
| 2011/0246290 A1 | 10/2011 | Howard |
| 2011/0258123 A1 | 10/2011 | Dawkins |
| 2011/0296508 A1 | 12/2011 | Os |
| 2011/0320344 A1 | 12/2011 | Faith |
| 2012/0011063 A1 | 1/2012 | Killian |
| 2012/0022943 A1 | 1/2012 | Howard |
| 2012/0023026 A1 | 1/2012 | Chen |
| 2012/0030101 A1 | 2/2012 | Boyd |
| 2012/0036071 A1 | 2/2012 | Fulton |
| 2012/0072312 A1* | 3/2012 | Lange .................. G06Q 30/06 705/27.1 |
| 2012/0084204 A1 | 4/2012 | Castell |
| 2012/0095895 A1 | 4/2012 | Aston |
| 2012/0101881 A1 | 4/2012 | Taylor |
| 2012/0116966 A1 | 5/2012 | Tan |
| 2012/0118950 A1 | 5/2012 | Belk |
| 2012/0123838 A1 | 5/2012 | Sparks |
| 2012/0136780 A1 | 5/2012 | El-Awady |
| 2012/0166333 A1 | 6/2012 | von Behren |
| 2012/0173431 A1 | 7/2012 | Ritchie |
| 2012/0190386 A1 | 7/2012 | Anderson |
| 2012/0215640 A1 | 8/2012 | Ramer |
| 2012/0215650 A1 | 8/2012 | Oba |
| 2012/0221421 A1 | 8/2012 | Hammad |
| 2012/0221502 A1 | 8/2012 | Jerram |
| 2012/0231844 A1 | 9/2012 | Coppinger |
| 2012/0259763 A1 | 10/2012 | Pessin |
| 2012/0304273 A1 | 11/2012 | Bailey |
| 2012/0310826 A1 | 12/2012 | Chatterjee |
| 2012/0323664 A1 | 12/2012 | Klems |
| 2013/0090750 A1 | 4/2013 | Herrman |

FOREIGN PATENT DOCUMENTS

| | | | |
|---|---|---|---|
| KR | 100432430 B1 | 5/2004 | |
| KR | 20060117177 A | 11/2006 | |
| KR | 20070104087 A | 10/2007 | |
| WO | 0165502 A2 | 9/2001 | |
| WO | 03023674 A1 | 3/2003 | |
| WO | 2010148737 A1 | 12/2010 | |

OTHER PUBLICATIONS

Business Wire, "New York State Department of Labor Selects JPMorgan Chase to Provide New Banking Services for Unemployment Insurance Benefits; JPMorgan Chase Electronic Services to Help Speed Benefit Payments", Business Wire, New York, Aug. 4, 2006, 2 p.

David Breitkopf, "ACS to Take Over Mich. WC Distribution Program", American Banker, New York, NY: Jul. 20, 2006, vol. 171. Issue 138, p. 6.

Gopalan, NP & Selvan, B Siva. TCP/IP Illustrated. Prentice-Hall. 2008. pp. 101-102, 175-176 and 235. 7 pages.

International Search Report and Written Opinion for PCT/US2010/033229 dated Dec. 29, 2010. (8 pages).

International Search Report and Written Opinion for PCT/US11/57173 dated Mar. 15, 2012. (11 pages).

International Search Report and Written Opinion for PCT/US11/57179 dated Jan. 5, 2012. (7 pages).

International Search Report and Written Opinion for PCT/US12/37597 dated Sep. 21, 2012 (11 pages).

International Search Report and Written Opinion for PCT/US12/41437 dated Aug. 24, 2012. (20 pages).

International Search Report and Written Opinion for PCT/US2010/048344 dated Nov. 15, 2010. (7 pages).

International Search Report and Written Opinion for PCT/US2012/027043 dated Jul. 13, 2012. 15 pages.

International Search Report and Written Opinion for PCT/US2013/020411 dated May 21, 2013. 18 pages.

International Search Report and Written Opinion for PCT/US2013/024538, dated May 31, 2013. 15 pages.

International Search Report and Written Opinion for PCT/US2013/031084, dated Jun. 4, 2013. 9 pages.

International Search Report and Written Opinion for PCT/US12/47092 dated Nov. 26, 2012. 11 pages.

International Search Report for PCT/US09/54921 dated Oct. 21, 2009. (2 pages).

International Search Report and Written Opinion for PCT/US2010/041860 dated Feb. 1, 2011. (8 pages).

International Search Report for PCT/US11/49393 dated Dec. 5, 2011. (2 pages).

International Search Report for PCT/US11/65305 dated Apr. 16, 2012. 2 pages.

International Search Report and Written Opinion for PCT/US2012/026205, dated May 29, 2012. 2 pages.

International Search Report for PCT/US12/23856 dated Jun. 6, 2012. 3 pages.

International Search Report for PCT/US12/24772 dated Jul. 24, 2012. 3 pages.

International Search Report for PCT/US 12/25530 dated Aug. 7, 2012. 4 pages.

International Search Report PCT/US12/27620 dated Aug. 10, 2012. 3 pages.

International Search Report for PCT/US 12/39638 dated Sep. 24, 2012. 4 pages.

International Search Report for PCT/US 12/45875 dated Nov. 16, 2012. 4 pages.

International Search Report and Written Opinion for PCT/US12/56759 dated Feb. 25, 2013. 12 pages.

International Search Report and Written Opinion for PCT/US12/57528 dated Dec. 17, 2012. 8 pages.

International Search Report for PCT/US12/57577 dated Nov. 29, 2012. 2 pages.

International Search Report and Written Opinion for PCT/US12/66898 dated Feb. 11, 2013. 14 pages.

International Search Report for PCT/US2010/033229 dated Dec. 29, 2010, 8 pages.

International Search Report for PCT/US2010/033547 dated Dec. 14, 2010 (3 pages).

International Search Report and Written Opinion for PCT/US2010/033861 dated Dec. 9, 2010 (7 pages).

International Search Report for PCT/US2010/045445 dated Feb. 24, 2011 (3 pages).

International Search Report for PCT/US2010/045500 dated Mar. 29, 2011 (3 pages).

PCT International Preliminary Report on Patentability dated Mar. 6, 2012 corresponding to application PCT/US2010/046833. 6 pages.

International Search Report and Written Opinion for PCT/US2011/032093 dated Aug. 24, 2011 (11 pages).

International Search Report for PCT/US2011/035268 dated Aug. 5, 2011 (3 pages).

(56) References Cited

OTHER PUBLICATIONS

International Search Report and Written Opinion for PCT/US2011/26734 dated Apr. 29, 2011 (7 pages).
International Search Report and Written Opinion for PCT/US2011/29790 dated May 19, 2011 (6 pages).
International Search Report and Written Opinion issued in connection with PCT/US11/42062 dated Sep. 29, 2011 (8 pages).
Shadrach, D.C. "A Weighted Metric Based Adaptive Algorithm for Web Server Load Balancing." 2009 Third International Symposium on Intelligent Information Technology Application, http://ieeexplore.ieee.org/xpl/articleDetails.jsp?arnumber=5369384, pp. 449-452.
Written Opinion for PCT/US12/27620 dated Aug. 10, 2012. 5 pages.
International Search Report and Written Opinion for PCT/US11/57180 dated Mar. 15, 2012 (11 pages).
International Search Report and Written Opinion for PCT/US12/55636 dated Nov. 30, 2012. 2 pages.
International Search Report and Written Opinion for PCT/US12/65738 dated Apr. 19, 2013. 9 pages.
International Search Report and Written Opinion for PCT/US2012/045601 dated Feb. 1, 2013. 11 pages.
International Search Report and Written Opinion for PCT/US2012/069557 dated Feb. 22, 2013. 8 pages.
International Search Report for PCT/US12/21000 dated May 15, 2012. 2 pages.
International Search Report and Writtten Opinion for PCT/US2011/039178 dated Sep. 16, 2011 (7 pages).
International Search Report for PCT/US11/57173 dated Mar. 15, 2012, 7 pages.
International Search Report for PCT/US2010/046833 dated Apr. 26, 2011,8 pages.
International Search Report and Written Opinion for PCT/US2011/024941 dated Apr. 19, 2011 (6 pages).

* cited by examiner

Figure 3 — Example Logic Flow: Transaction Tracking Component

Figure 4 — Example Logic Flow: Usage Tracking Component

Example Data Flow: Refund Request

Figure 6 — Example Logic Flow: Refund Determination Component

Example Refund Schedule Component

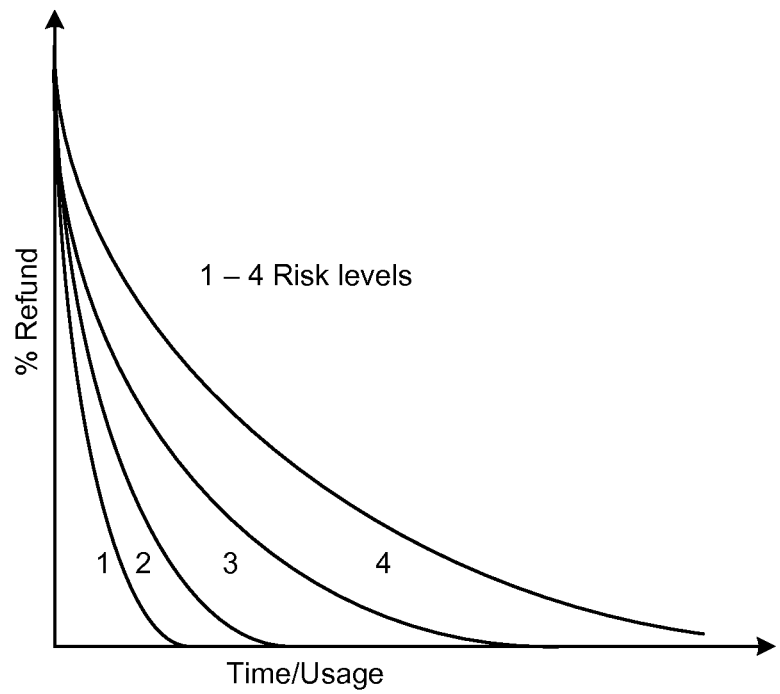
Figure 8A  Example Refund Determination Graphs
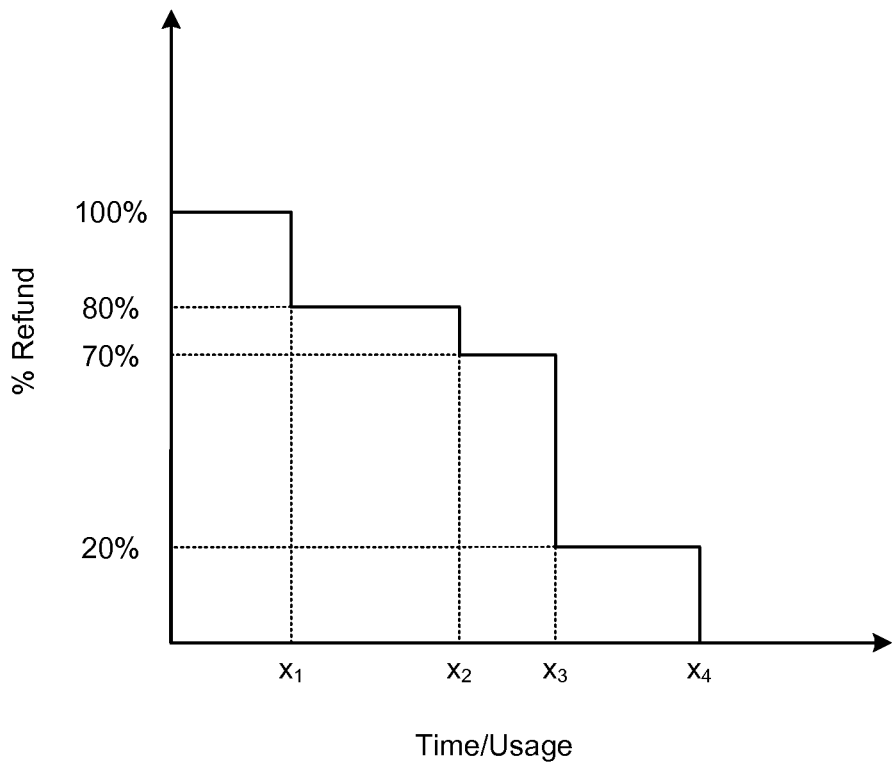
Figure 8B  Example Refund Determination Graphs

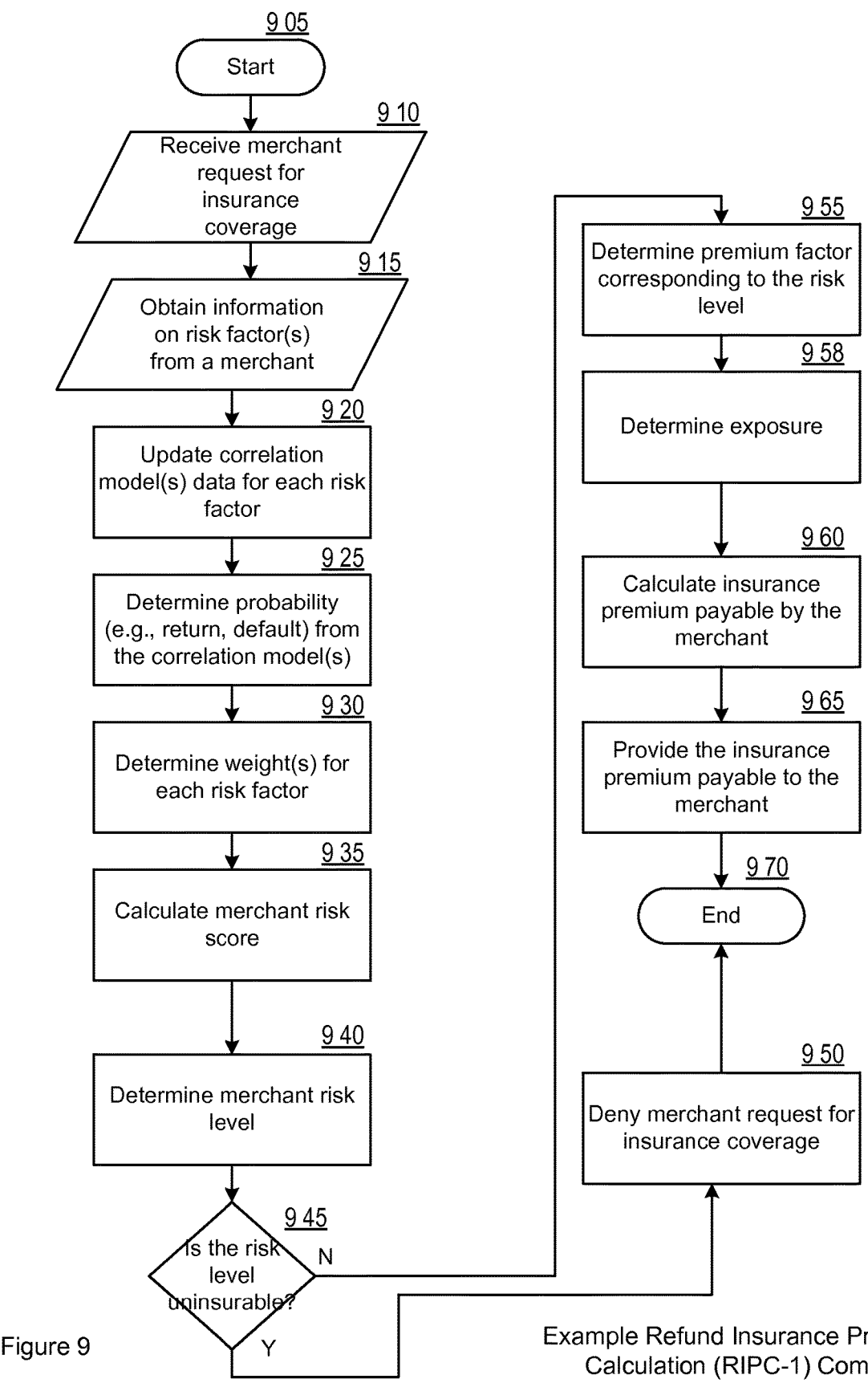
Figure 9 — Example Refund Insurance Premium Calculation (RIPC-1) Component Example Refund Insurance Premium Calculation (RIPC-2) Component

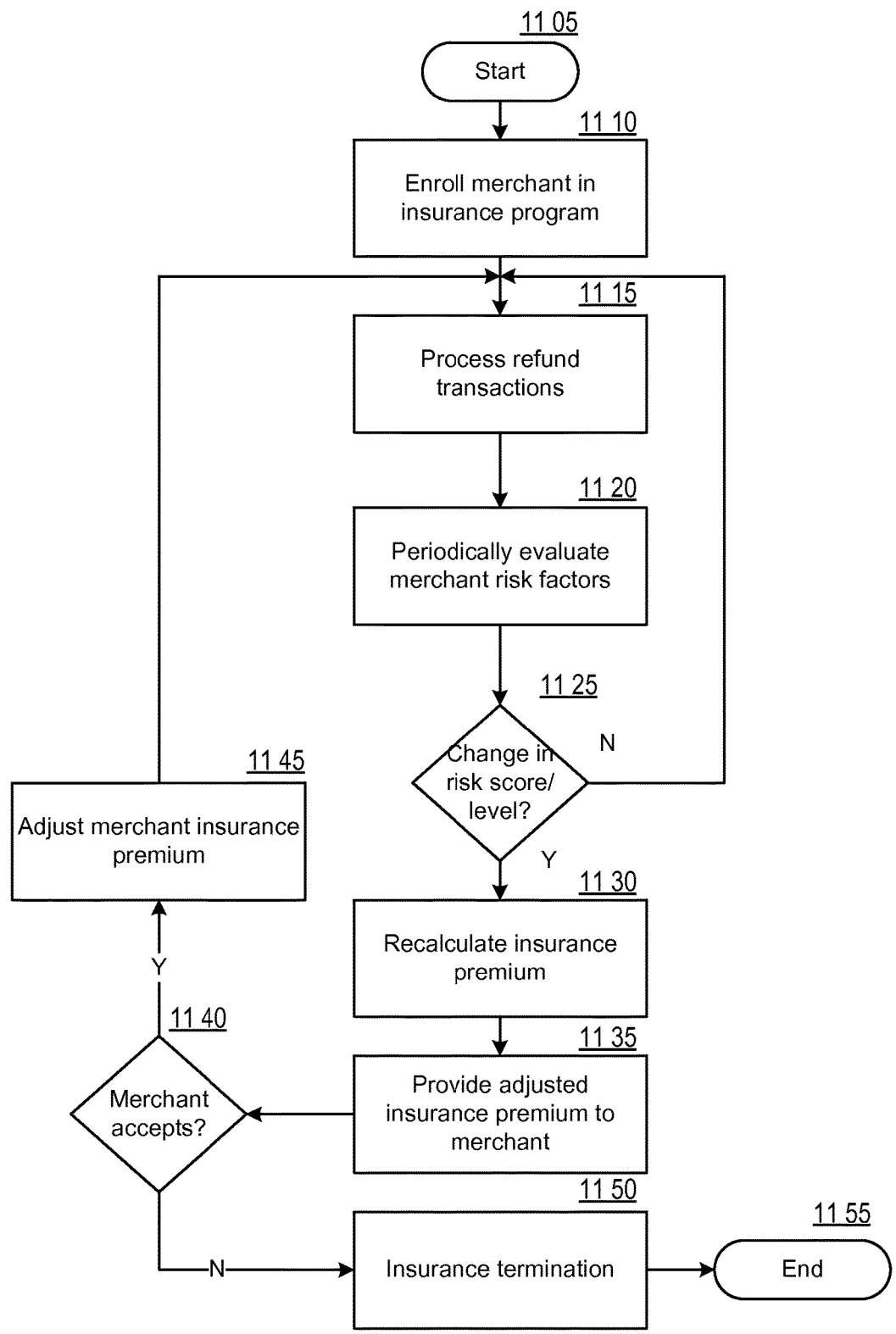
Figure 11 — Example Refund Insurance Premium Evaluation (RIPE) Component

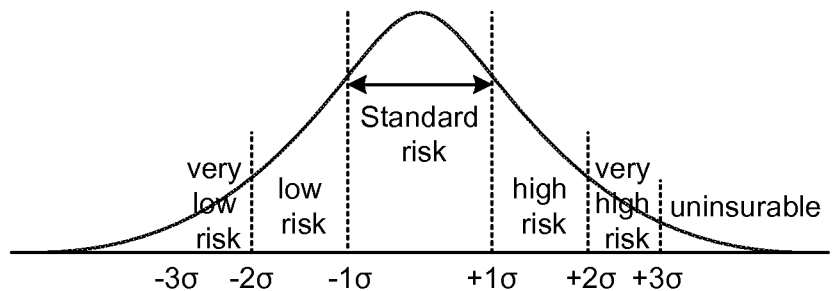
Figure 12A      Example Merchant Risk Score Distribution
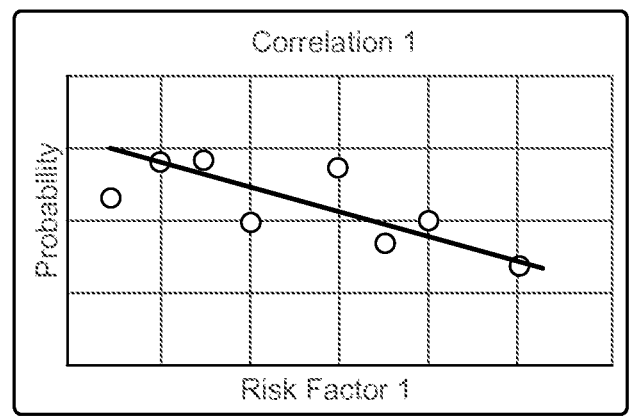
Figure 12B      Example Probability - Risk Factor Correlation Graph
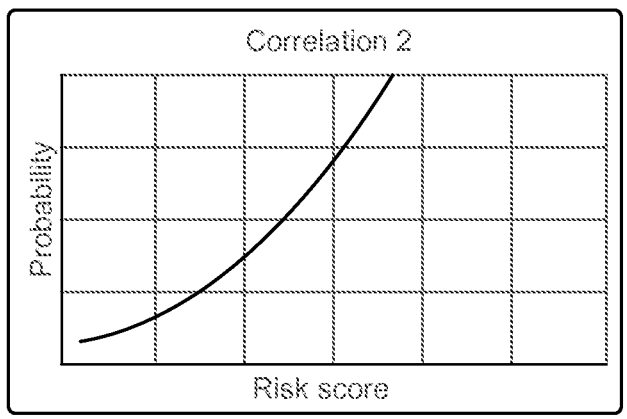
Figure 12C      Example Probability - Risk Score Correlation Graph

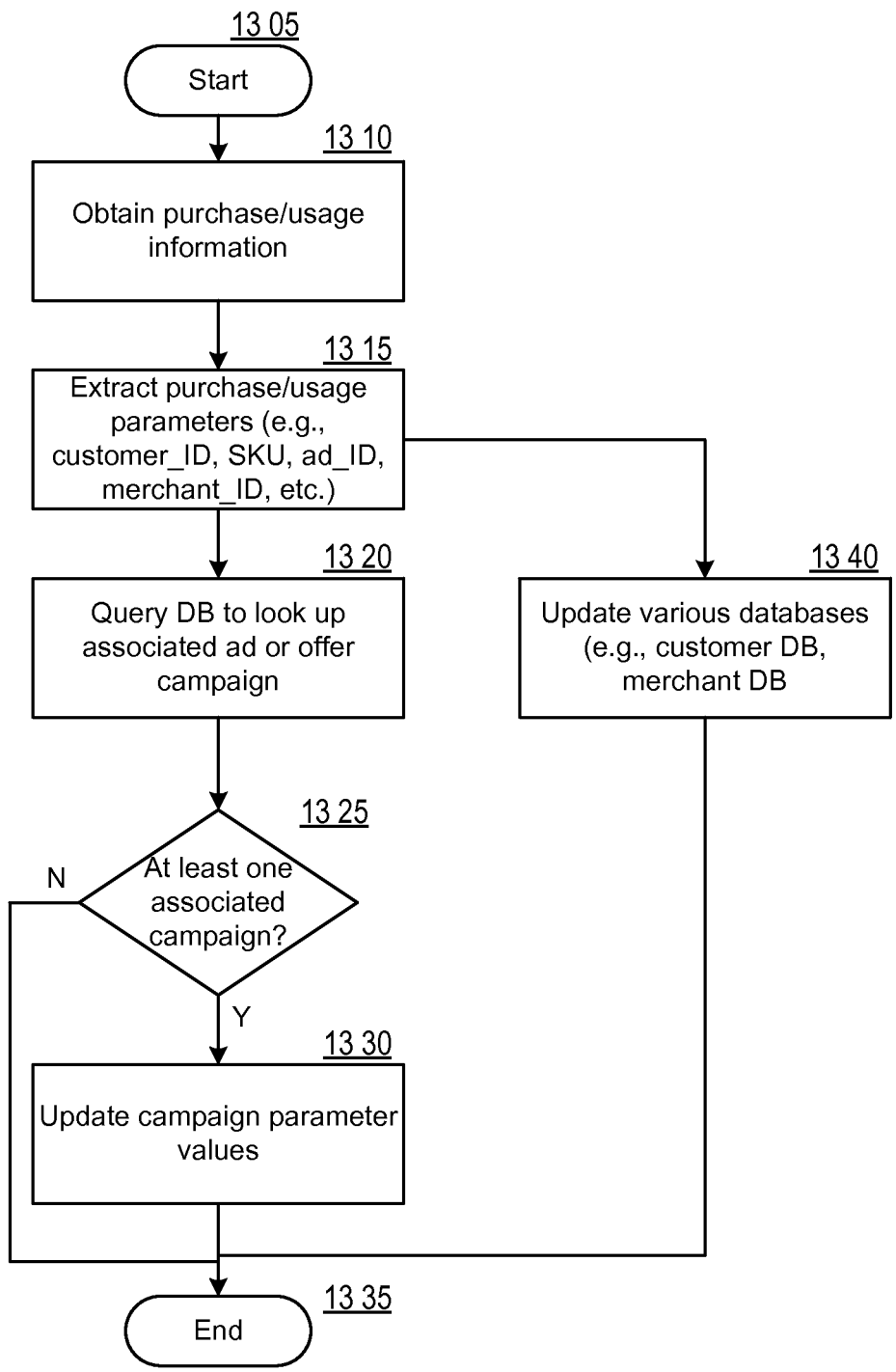
Figure 13      Example Logic Flow: Analytics Collection Component

Example Analytics Reporting Graphs

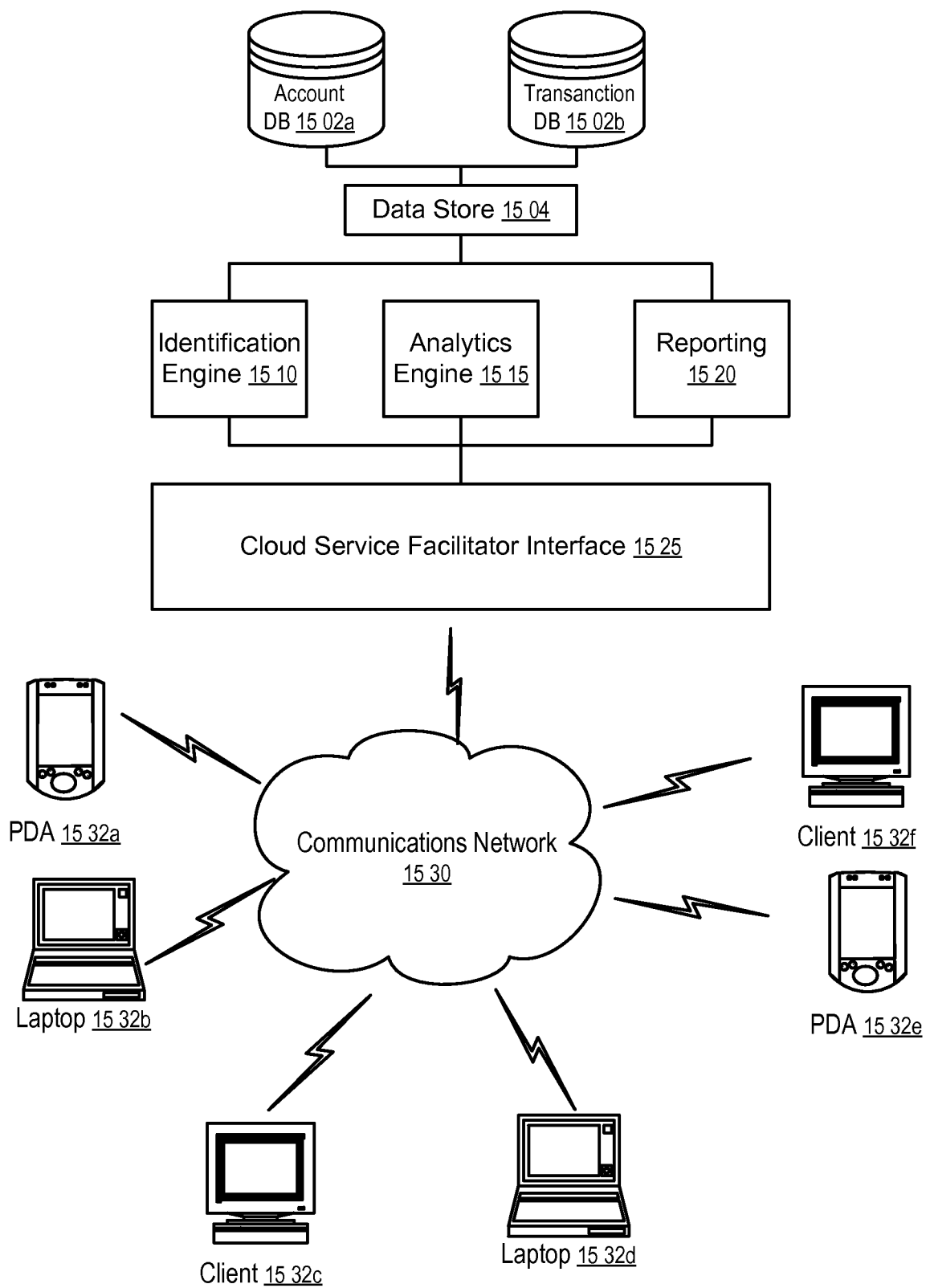
Figure 15 — Example Cloud Service Facilitator Components

CLOUD SERVICE FACILITATOR APPARATUSES, METHODS AND SYSTEMS

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

RELATED APPLICATIONS

This application claims priority to U.S. patent application Ser. No. 13/411,499 entitled CLOUD SERVICE FACILITATOR APPARATUSES, METHODS AND SYSTEMS filed on Mar. 2, 2012 which claims priority to U.S. Provisional patent application Ser. No. 61/449,575 filed Mar. 4, 2011, entitled "Apparatuses, Methods and Systems for Storing User Information of Cloud Products and Services." The entire contents of the aforementioned applications are herein expressly incorporated by reference.

FIELD

The present innovations are directed generally to facilitating e-commerce and providing insurance for products and/or services, and more particularly, to CLOUD SERVICE FACILITATOR APPARATUSES, METHODS AND SYSTEMS.

BACKGROUND

Apple Inc.'s App Store and Android's App Marketplace provide mechanisms for consumers to purchase and acquire software programs. A consumer establishes an account with the company and may thereby gain access to the App Store/Marketplace and select programs for purchase. Once selected and authorized, those programs may be downloaded to the consumer's desktop or mobile device.

BRIEF DESCRIPTION OF THE DRAWINGS

The accompanying appendices and/or drawings illustrate various non-limiting, example, innovative aspects in accordance with the present descriptions:

FIGS. 8A and 8B show graphical diagrams illustrating example variation of refund with time/usage in some embodiments of the CSF;

FIG. 9 shows a logic flow diagram illustrating example refund insurance premium calculation (RIPC-1) component in some embodiments of the CSF;

FIG. 11 shows a logic flow diagram illustrating example refund insurance premium evaluation (RIPE) component in some embodiments of the CSF;

FIG. 12A shows a graphical diagram illustrating example merchant risk score distribution in some embodiments of the CSF;

FIG. 12B shows a graphical diagram illustrating example correlation between risk factor and probability of a risk event in some embodiments of the CSF;

FIG. 12C shows a graphical diagram illustrating example correlation between risk score and probability of a risk event in some embodiments of the CSF;

FIG. 13 shows a logic flow diagram illustrating example analytics collection component in some embodiments of the CSF;

FIG. 15 shows a block diagram illustrating example components in some embodiments of the CSF.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Cloud-enabled businesses have apparent advantages such as reduced time to start a business. For example, a software vendor who wants to deploy an application can do so without making any investments in procuring necessary hardware. The vendor can simply purchase a cloud product offering from a cloud service provider such as Amazon, Google or Microsoft and activate it via an Application Programming Interface (API) such as REST API. The vendor pays for network bandwidth, storage and CPU cost, while the service provider arranges the necessary computation resource and deployment, as well as automated maintenance (e.g., security patches), streamlining the process of entering the market as well as reducing operational costs for businesses, large and small.

Despite the aforementioned advantages of being cloud-enabled, selling and purchasing cloud products/services is not without risk. Often, cloud products/services have inadequate terms of service control systems. For example, a cloud product/service could be discontinued or the merchant may go out of business leaving the buyer of the cloud product/service no viable means of recouping his or her investment. Further, cloud product/services are difficult to price and there is simply no easy way to return purchased cloud product/services for a refund. For business entities such as vendors and merchants (hereinafter "merchants"), these issues can be insurmountable barriers to entry. For consumers, there is uncertainty regarding the long-term value of a given cloud product/service.

Embodiments of the CSF provide apparatuses, methods and systems for managing and/or reducing risks associated with e-commerce activities including risks associated with transaction and usage of cloud products/services. Some embodiments of the CSF also provide analytics services to merchants or other parties.

CSF

Figure 1A:
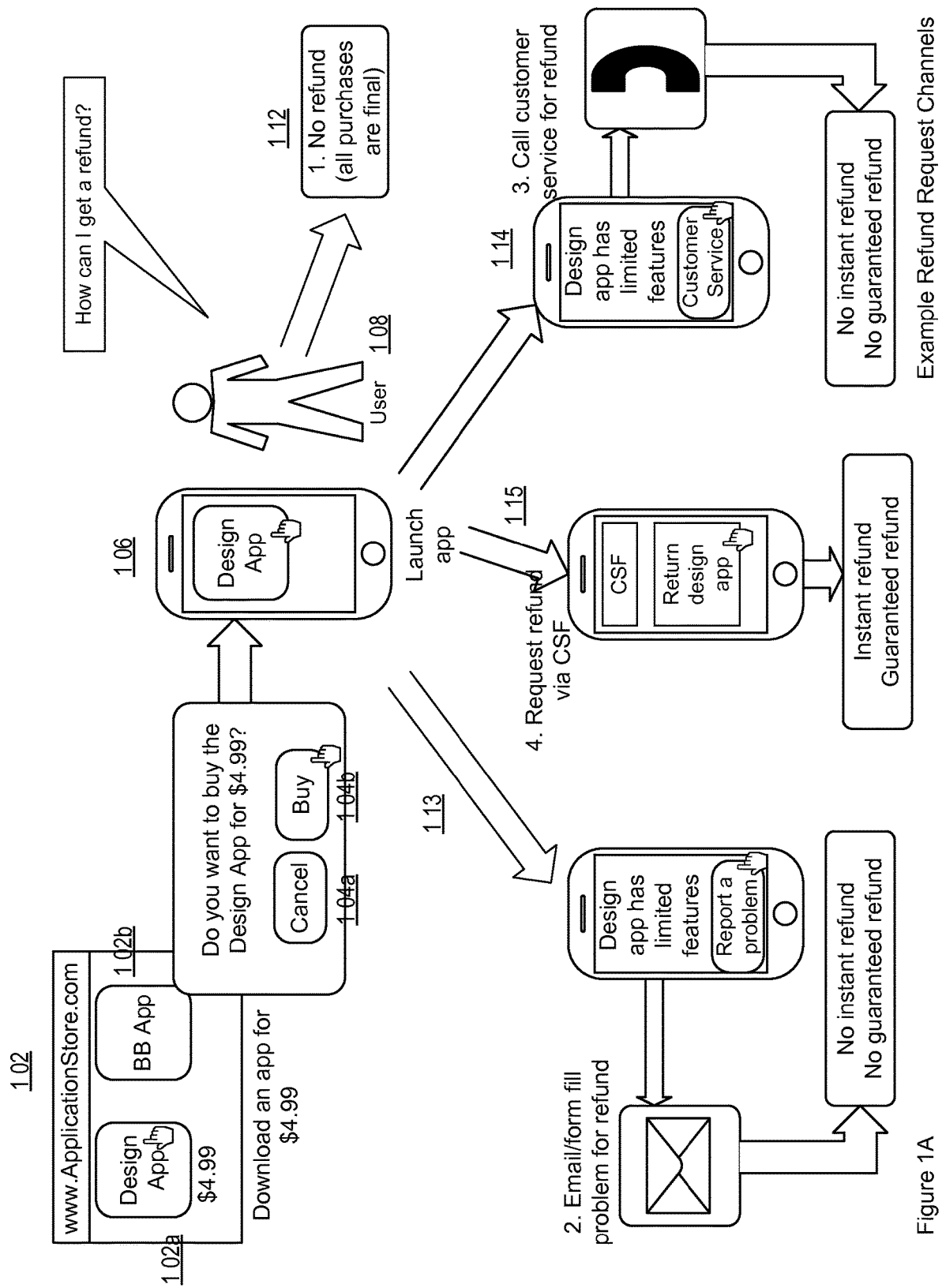
FIG. 1A shows a block diagram illustrating example CSF refund request channel.

FIG. 1 shows a block diagram illustrating example CSF refund request channel. A merchant 102 (e.g., application stores such as Apple's app store) may sell a number of products and/or services (e.g., 102a, 102b). A user 108 may wish to purchase an item 102a from the store. When the user initiates the purchase transaction, the user may be prompted to cancel 104a or confirm 102b the purchase. Upon completing the purchase, the purchased product may be downloaded to a user selected device or location such as 106 (e.g., a smart phone, a tablet, a computer, an account in the cloud, etc.). The user may engage with the downloaded product in various ways. In some cases, the user may not engage with the downloaded product at all. While in other cases, the user may experience issues with the product. For any number of reasons, the user may wish to return the product to the merchant and obtain a refund.

Where the user accepted the merchant's condition for purchase that all sales are final, the user has no channel for obtaining a refund (112). If the merchant has provided an option for reporting a problem with the product and the user has encountered an actual problem with the product (e.g., the application crashes), the user may utilize an email/form fill channel 113 to send an email or fill out a form explaining the problem in order to initiate investigation of the problem. The merchant may then review the explanation and reported problem and, on a case by case basis, respond to the user. In any case, the user does not obtain an instant resolution to his problem, and there is no guarantee of a refund even if the merchant acknowledges the reported problem with the product. If the user has an actual issue with the product, and the merchant has provided a customer service number for reporting issues with the product, the user can utilize the customer service channel 114 to contact the customer service via phone and explain the issue. As in the e-mail channel, the resolution of the problem takes a long time, and the resolution does not necessarily result in a refund to the user.

Embodiments of the CSF provide a new and effective channel 115 for requesting refunds from merchants. These refunds may be processed immediately, making the refund process painless and instant. In some implementations, refunds for products purchased from various merchants may be requested via the CSF provided that the merchants are affiliated with the CSF program or are participating in the CSF insurance program. In some implementations, refund requests for products purchased from merchants that are out of business may also be made using the CSF.

Figure 1B:
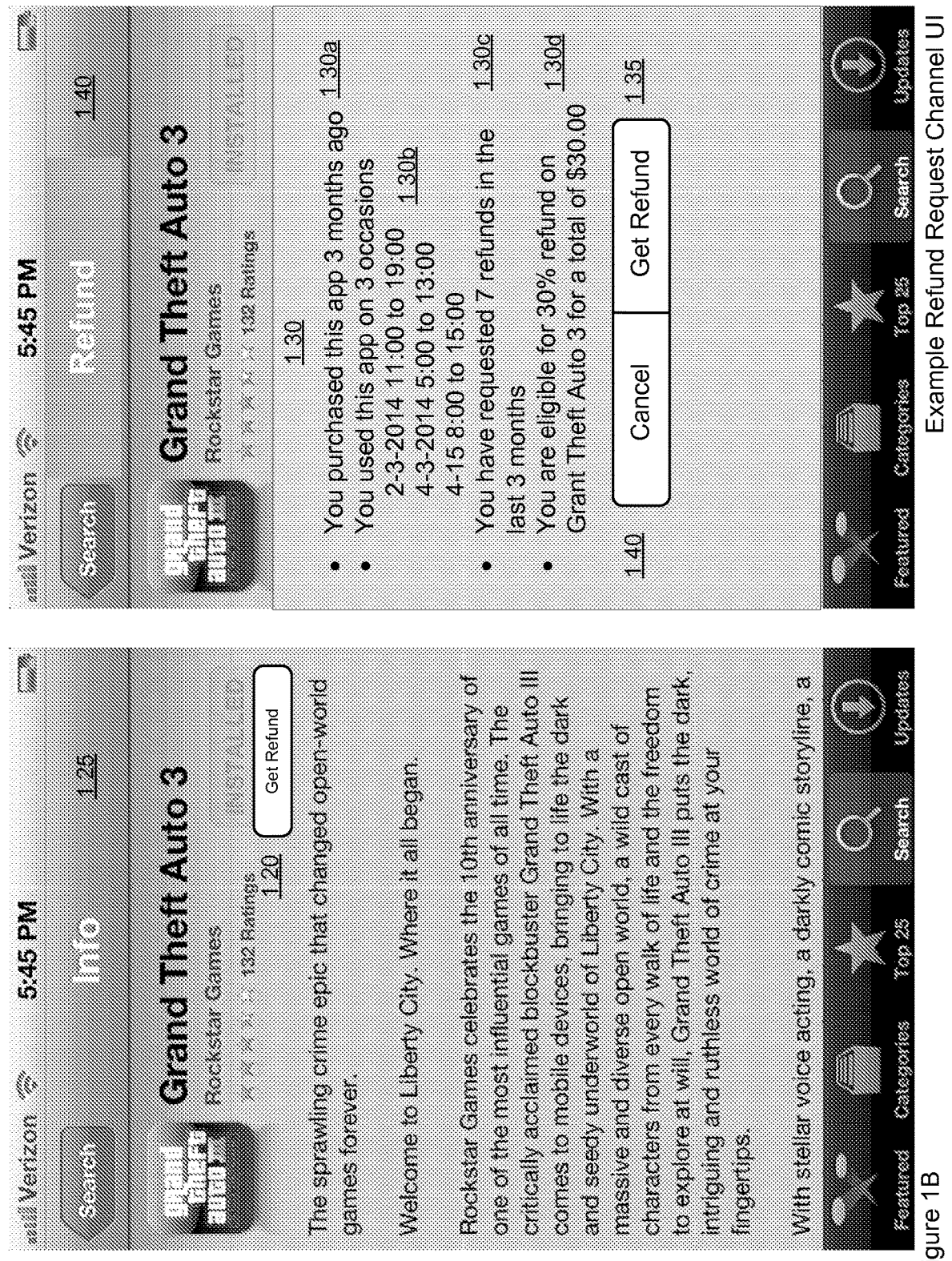
FIG. 1B shows user interface (UI) diagrams illustrating example CSF refund request channel.

FIG. 1B shows user interface (UI) diagrams illustrating example CSF refund request channel in some embodiments of the CSF. In one implementation, for example, a user may wish to obtain a refund for a game (e.g., Grand Theft Auto 3) that he no longer wishes to play. The UI on the left shows an implementation where the information panel 125 has a "get refund" button 120 which can be tapped or selected to launch the display panel 140. The refund display panel may utilize the user's purchase and usage history, and may display relevant information 130a-d affecting the value of the refund. For example, the display area 130 may indicate the length of time passed since purchase 130a, usage information 130b, refund history 130c, and/or the like. The UI may also display the amount of refund 130d that the user, based on the purchase and usage history 130a-c, is eligible for. The user may view these information and may either accept the determined refund by selecting the get refund button 135, or cancel the refund transaction by selecting the cancel button 140.

Figure 2:
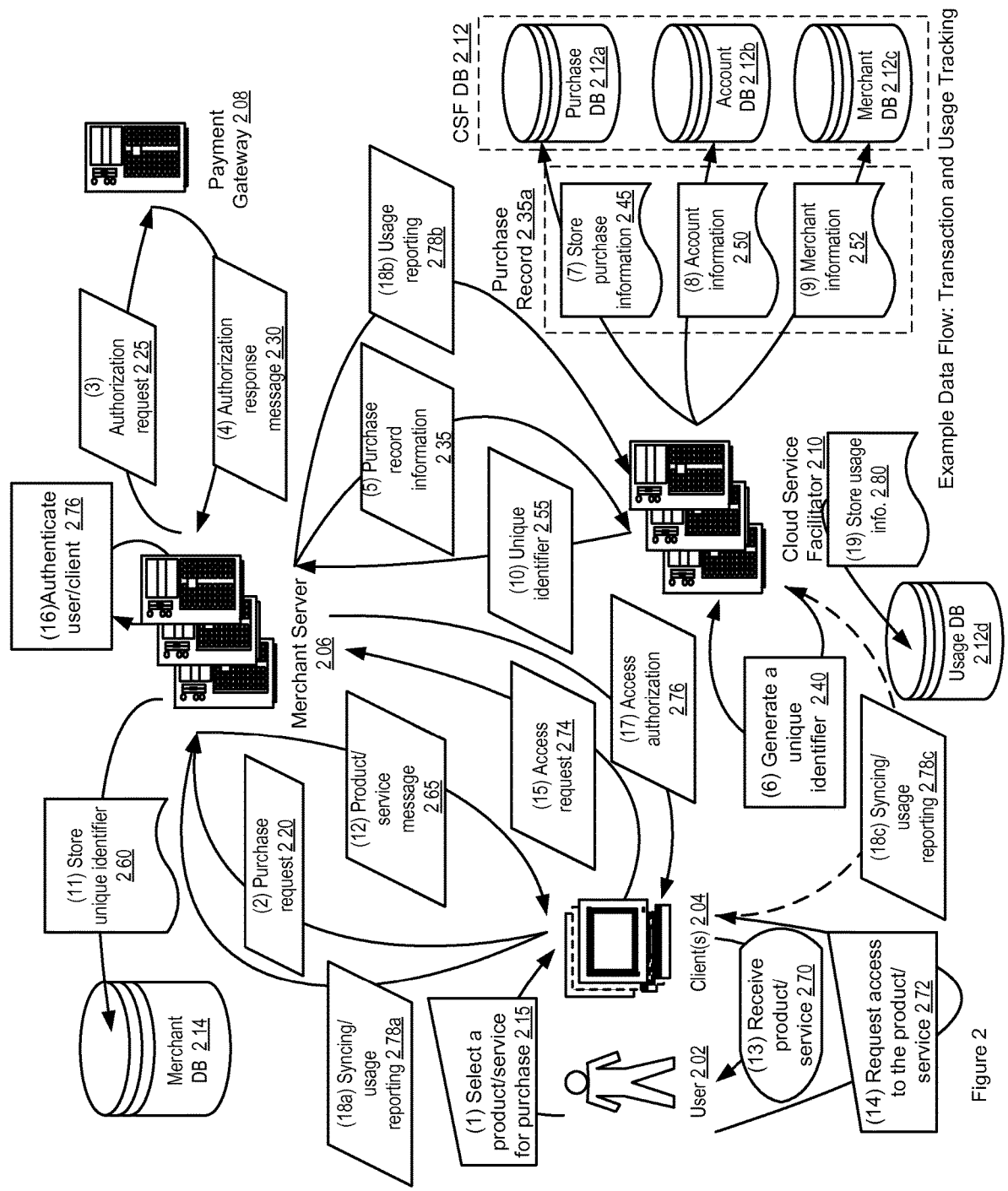
FIG. 2 shows a data flow diagram illustrating transaction and usage tracking in some embodiments of the CSF.

FIG. 2 shows a data flow diagram illustrating transaction and usage tracking in some embodiments of the CSF. In one embodiment, a user 202 may issue an instruction to purchase a product or service 215 using a client device 204. In one implementation, the user 202 may open his or her web browser and access a website hosted at the merchant server 206 to initiate the purchase transaction. In another implementation, the user 202 may access an application installed on the client 204 to access an application store ("app store") such as the Apple App Store, Android Market and Windows Market Place for Mobile to purchase a product or service. It should be noted, that although purchases may take place in such app stores or market places, the user may have been referred to such products via advertisements, e.g., referring websites, ad banners, coupon, offers, etc. These referring sites may be made part of the purchase request 220 and will eventually be stored in the usage database 212d and purchase database 212a such that various analytics may be performed to gauge the risk profile of various referring sources; e.g., referrals from coupon sites may have greater risk of refund requests than referrals from high-end gadget blogs advertisements (for more details see FIG. 8b-14 and throughout). In yet another implementation, the purchase request 215 may be made via a mobile device (e.g., smart phone) or through point of sale terminals (POS) by swiping, tapping or bringing into proximity (e.g., Near Field Communication enabled devices) payment devices such as credit cards, debit cards, prepaid cards, mobile devices including those having card readers, e-wallets, etc. and/or the like. The purchase instruction 215 may include user information, product/service information, payment information, and/or the like necessary to make a purchase. For example, the purchase request 215 may include user name, billing address, shipping address, email, payment information (e.g., credit, debit or prepaid card information) and/or the like. In some implementations, the client device may take the user's instructions and generate a purchase request (e.g., 220) for transmission from the client device to the merchant server 206. For example, the client may provide a (Secure) Hypertext Transfer Protocol ("HTTP(S)") POST message including data formatted according to the eXtensible Markup Language ("XML"). An example purchase request 220, substantially in the form of a HTTP(S) POST message including XML-formatted data, is provided below:

```
POST /purchaserequest.php HTTP/1.1
Host: www.merchant.com
Content-Type: Application/XML
Content-Length: 667
<?XML version = "1.0" encoding = "UTF-8"?>
<purchase_request>
        <checkout_ID>M234576</checkout_ID>
        <timestamp>2011-02-22 15:22:43</timestamp>
    <purchase_detail>
        <num_products>5</num_products>
        <product_ID>AE95049324</product_ID>
        <product_ID>MD09808755</product_ID>
        <product_ID>OC12345764</product_ID>
        <product_ID>KE76549043</product_ID>
        <product_ID>SP27674509</product_ID>
```

```
        <total>245</total>
        <currency>USD</currency>
    </purchase_detail>
    <account_params>
        <account_name>Jon Doe</account_name>
        <account_type>credit</account_type>
        <account_num>4455897067567654</account_num>
        <expire_date>05-2015</expire_date>
        <CVV_code>455</CVV_code>
        <billing_address>700 Corona St., Corvalis, OR 972004</billing_address>
        <phone>123-456-5567</phone>
        <email>j.doe@corona.com</email>
        <confirm_type>email</confirm_type>
    </account_params>
    <!--optional parameters-->
    <shipping_info>
        <shipping_address>same as billing</shipping_address>
        <ship_type>expedited</ship_type>
        <ship_carrier>FedEx</ship_carrier>
        <tracking_flag>true</tracking_flag>
        <sign_flag>false</sign_flag>
    </shipping_info>
    <client_detail>
        <client_IP>192.168.23.233</client_IP>
        <client_type>smartphone</client_type>
        <client_model>HTC Hero</client_model>
        <OS>Android 2.2</OS>
        <app_installed_flag>true</app_installed_flag>
    </client_detail>
    <referral_site>couponsavvy.com/offers</referral_site>
    <promo_code>FEB29</promo_code>
    <promo_discount>10%</promo_discount>
</purchase_request>
```

The purchase request 220 may be sent over a communication network (e.g., internet) to the merchant server 206. The merchant server, in response to the receipt of the purchase request, may initiate an authentication procedure to determine whether the payment information in the purchase request is valid, and has been provided by an authorized account holder. In one embodiment, the purchase request message may be forwarded to an acquirer as an authorization request message. After receiving the authorization request message, the acquirer may forward the message to a payment processing network. An exemplary payment processing network may include VisaNet which processes credit, debit and various other types of transactions. VisaNet may include a Visa Integrated Payments (VIP) system which processes authorization requests and a Base II system which performs clearing and settlement services. The payment processing network may forward the authorization request message to the issuer of the payment account (e.g., issuer of the credit card). The issuer may respond with an authorization response message that includes the status of the transaction (e.g., authorized or declined) back to the payment processing network, which in turn may forward the response message to the acquirer, which in turn may forward the message to the merchant. In another embodiment, the merchant may forward the purchase request 225 via an API to a payment gateway 208 (e.g., Authorizenet, Paypal, Google Checkout, Verisign, etc.). The payment gateway 208 may, in turn, forward the purchase request 225 to an acquiring bank. After receiving the purchase request, the acquiring bank may transmit an authorization request message to an interchange such as Visa and MasterCard. The interchange may verify the payment information with an issuer of the payment account or device. The issuer may approve or decline the transaction and pass the result in an authorization message or a code to the interchange. After receiving the authorization response message, the interchange may relay the result to the acquiring bank, which may routes the received authorization response message back to the payment gateway 208. The payment gateway 208 may receive the authorization response message and may transmit the result/authorization message 230 to the merchant 206. In this way, the user's purchase request is authorized (or declined).

An exemplary authorization response message 230, substantially in the form of a HTTP(S) POST message including XML-formatted data, is provided below:

```
<auth_response>
    <merchant_ID>45767</merchant_ID>
    <MCC>5000</MCC>
    <status>approved</status>
    <charge_total>245</charge_total>
    <currency>USD</currency>
    <account_params>
        <account_name>Jon Doe</account_name>
        <account_type>credit</account_type>
        <account_num>4455897067567654</account_num>
        <expire_date>05-2015</expire_date>
        <CVV_code>455</CVV_code>
        <billing_address>700 Corona St., Corvalis, OR 972004</billing_address>
    </account_params>
</auth_response>
```

In one embodiment, the merchant 206 may utilize an API to send the purchase information 235 directly or indirectly to the Cloud Service Facilitator 210. In one implementation, the purchase record information 235 may include some or all information contained in the purchase request 220. In another embodiment, the purchase information 235 may be provided directly from the payment processing network and/or payment gateway 208, in which case, the merchant server 206 need not communicate the purchase record information to the CSF server 210. In one embodiment, an exemplary purchase record information 235, substantially in the form of a HTTP(S) POST message including XML-formatted data, is provided below:

```
<purchase_record>
    <merchant_ID>45767</merchant_ID>
    <record_ID>2300</record_ID>
    <purchase_details>
        <num_products>5</num_products>
        <product1_ID>AE95049324</product1_ID>
        <product1_price>80</product1_price>
        <product2_ID>MD09808755</product2_ID>
        <product2_price>100</product2_price>
        <product3_ID>OC12345764</product3_ID>
        <product3_price>80</product3_price>
        <product4_ID>KE76549043</product4_ID>
        <product4_price>20</product4_price>
        <product5_ID>SP27674509</product5_ID>
        <product5_price>45</product5_price>
        <total>245</total>
        <discount>10%</discount>
        <sales_tax>0</sales_tax>
        <currency>USD</currency>
        <purchase_date>5-12-2015</purchase_date>
        <purchase_time>12:05:05</purchase_time>
        <charge_total>220.5</charge_total>
        <referral_site>couponmom.com</referral_site>
        <promo_code>29</promo_code>
    </purchase_details>
    <account_params>
        <account_name>Jon Doe</account_name>
        <account_type>credit</account_type>
        <account_num>4455897067567654</account_num>
        <expire_date>05-2015</expire_date>
        <CVV_code>455</CVV_code>
```

```
        <billing_address>700 Corona St., Corvalis, OR
972004</billing_address>
    </account_params>
</purchase_record>
```

After receiving the purchase record information 235, the CSF server 210 may generate a unique identifier (e.g., an alphanumeric, numeric, or alphabetic key, hash value, etc.) at 240. In one implementation, each purchase record may be assigned a unique identifier. In a further implementation, when multiple items are purchased, each item may have its own purchase record, and each purchase record may have an associated unique record key. In one embodiment, the CSF server may parse the received purchase record and extract product information 245, account information 250, merchant and/or other information from the received purchase record information 235 and may store the extracted information in associated with the unique record identifier in one or more databases and/or tables. For example, in one implementation, the extracted information may be stored as a purchase record 235*a* in the CSF database 212. In another implementation, the extracted information may be stored separately in one or more databases and/or tables such as the purchase database 212*a*, the account database 212*b* and the merchant database 212*c*. An exemplary listing, written substantially in the form of PHP/SQL commands, to store purchase record information 235 to a database, is provided below:

```
<?PHP
header('Content-Type: text/plain');
// store input data in a database
mysql_connect("201.408.185.132",$DBserver,$password); //
access database server
mysql_select("CSF_DB.SQL"); // select database to append
mysql_query("INSERT INTO RecordsTable (record_key
product_ID product_price account_ID)
VALUES ($record_key, $product_ID, $product_price,
$account_ID)"); // add data to RecordsTable table in a CSF
database
mysql_query("INSERT INTO AccountsTable (account_ID
account_name account_type account_num expire_date CVV_code
billing_address)
VALUES ($account_ID, $account_name, $account_type,
$account_num, $expire_date, $CVV_code, $billing_address)");
// add data to AccountsTable table in a CSF database
mysql_close("CSF_DB.SQL"); // close connection to database
?>
```

In this way, the CSF may establish an independent record of the relationship between the user 202 and merchant. The CSF server may transmit the generated unique record identifier 255 to the merchant server 206. The unique record identifier may be sent in a message that includes a confirmation of receipt and/or creation of the purchase record. The merchant server 206 may also store the unique record identifier 260 in its own merchant database and/or table (e.g., merchant database 214).

In one embodiment, the merchant server 206 may make available to the user the purchased product and/or service after the purchase transaction is authorized. The merchant may send a product/service message 265 to the client device 204. In one implementation, the product/service message may be a confirmation message notifying the user that the product/service is available for access or use. In another implementation, the product/service message may a link or instructions on how to access the product, or credentials for accessing a product, and/or the like. The client device 204 may render the received product/service message 265 for display 270 to the user 202.

In one embodiment, the user 202 may place a request 272 to access the product/service. In one implementation, the purchased product/service, e.g., a cloud product or service, may be accessible via the internet. The client device 204 may generate an access request 274 using the user provided login and/or other credentials and send the access request to the merchant server 206. An exemplary access request 274, substantially in the form of a HTTP(S) POST message including XML-formatted data, is provided below:

```
POST /authenticate.php HTTP/1.1
Host: www.merchant.com
Content-Type: Application/XML
Content-Length: 667
<?XML version = "1.0" encoding = "UTF-8"?>
<access_request>
    <request_ID>M234576</request_ID>
    <timestamp>2011-02-22 15:22:43</timestamp>
    <user_ID>j.doe@corona.com</user_ID>
    <password>comexico</password>
    <product_ID> AE95049324</product_ID>
  <client_detail>
    <client_IP>192.168.23.233</client_IP>
    <client_type>smartphone</client_type>
    <client_model>HTC Hero</client_model>
    <OS>Android 2.2</OS>
    <app_installed_flag>true</app_installed_flag>
  </client_detail>
</access_request>
```

After receiving the access request 274, the merchant server may authenticate 276 the user and/or client device. In one implementation, the merchant server may verify the user_ID and password using its own records in one or more merchant databases (e.g., merchant database 214). In a further implementation, the merchant may also verify that the location of the client device or the client device information during user authentication. If the user/client authentication is successful, the merchant server may send an access authorization message 276 to the client device 204. In one implementation, the access authorization message 276 may include a session ID, unique record identifier associated with the product being used, and/or the like. An exemplary access authorization message 276, substantially in the form of a HTTP(S) POST message including XML-formatted data, is provided below:

```
POST /accessauth.php HTTP/1.1
Host: www.merchant.com
Content-Type: Application/XML
Content-Length: 667
<?XML version = "1.0" encoding = "UTF-8"?>
<access_auth>
    <request_ID>M234576</request_ID>
    <timestamp>2011-02-22 15:22:43</timestamp>
    <auth_status>true</auth_status>
    <user_ID>j.doe@corona.com</user_ID>
    <password>comexico</password>
    <product_ID> AE95049324</product_ID>
</access_request>
```

After receiving the access authorization message 276 from the merchant server 206, the client device may render the request product/service for use by the user 202. In one embodiment, a log file may be created and updated in the client device itself to track start, end, pause, or other events associated with the product/service. In another embodiment, when the product/service requires an internet connection to the merchant server(s), events such as start, end, pause, etc., may be directly reported to the merchant. For example, in one implementation, the client device may generate and send a syncing/usage reporting message 278a to the merchant server. In yet another embodiment, usage events may be directly reported to the CSF. For example, in one implementation, the client device may generate and send a syncing/usage reporting message 278c to the CSF. In one implementation, sync data may be specific to syncing a device such as an iPhone or Android with their account information. An exemplary syncing/usage reporting message 278a, substantially in the form of a HTTP(S) POST message including XML-formatted data, is provided below.

```
POST /usagereporting.php HTTP/1.1
Host: www.merchant.com/reporting
Content-Type: Application/XML
Content-Length: 667
<?XML version = "1.0" encoding = "UTF-8"?>
<usage_report>
   <report_ID>R234576</report_ID>
   <timestamp>2015-02-22 15:22:43</timestamp>
   <session1_details>
      <session_ID>12090</session_ID>
      <start>2015-02-22 13:12</start>
      <end>2015-02-23 5:12</end>
      <session_length>16 hours</session_length>
      <product_ID>465768789</product_ID>
      <product_name>Halo2</product_name>
   </session1_details>
   <session2_details>
      <session_ID>12345</session_ID>
      <start>2015-02-24 12:02</start>
      <end>2015-02-24 14:12</end>
      <session_length>2 hours 10
minutes</session length>
      <product_ID>465768789</product_ID>
      <product_name>Halo2</product_name>
   </session2_details>
   <session3_details>
      <session_ID>12350</session_ID>
      <start>2015-03-24 12:02</start>
      <end>2015-03-24 15:02</end>
      <session_length>3 hours</session_length>
      <product_ID>234354667</product_ID>
      <product_name>Grand Theft Auto</product_name>
   </session3_details>
   <client_details>
      <client_IP>192.168.23.233</client_IP>
      <client_type>smartphone</client_type>
      <client_model>HTC Hero</client_model>
      <OS>Android 2.2</OS>
      <app_installed_flag>true</app_installed_flag>
   </client_details>
   <user_details>
      <user_ID>j.doe@corona.com</user_ID>
      <password>comexico</password>
   </user_details>
   <sync_session>
      <client_IP>192.168.23.233</client_IP>
      <client_type>smartphone</client_type>
      <client_model>HTC Hero</client_model>
      <OS>Android 2.2</OS>
      <app_installed_flag>true</app_installed_flag>
      <user_ID>j.doe@corona.com</user_ID>
      <password>comexico</password>
      <last_sync_date>02-02-2013</last_sync_data>
      <sync_data>jqwiodwifdwhdwwaf . . . </sync_data>
   </sync_session>
</usage_report>
```

In one implementation, at the start and/or end of each session, the merchant server 206 may send usage reporting message 278c along with the associated unique record identifier to the CSF. An exemplary syncing/usage reporting message 278c, substantially in the form of a HTTP(S) POST message including XML-formatted data, is provided below.

```
POST /usagereporting.php HTTP/1.1
Host: www.CSF.com/reporting
Content-Type: Application/XML
Content-Length: 667
<?XML version = "1.0" encoding = "UTF-8"?>
<usage_report>
   <report_ID>R234576</report_ID>
   <timestamp>2015-02-22 15:22:43</timestamp>
   <record_key>5761183HFD79098GH</record_key>
   <session_details>
      <session_ID>12090</session_ID>
      <start>2015-02-22 13:12</start>
      <end>2015-02-23 5:12</end>
      <session_length>16 hours</session_length>
   </session_details>
</usage_report>
```

After receiving the usage reporting message 278c from the merchant server 206, or the usage reporting message 278b directly from the client 204 in some implementations, the CSF server 210 may parse the received message and extract one or more fields of usage information to create a usage record 280 for storage in one or more databases and/or tables (e.g., usage database 212d). The usage record may be stored in association with the unique record identifier. In this manner, the CSF may not only establish an independent record of purchase of a product/service, but also maintaining an independent record of successive usage of the product/service.

In one embodiment, the Cloud Service Facilitator may be implemented within the framework of payment processing networks such as Visa and MasterCard. In another embodiment, the Cloud Service Facilitator may be implemented as an entity separate from payment processing networks/interchanges.

Figure 3:
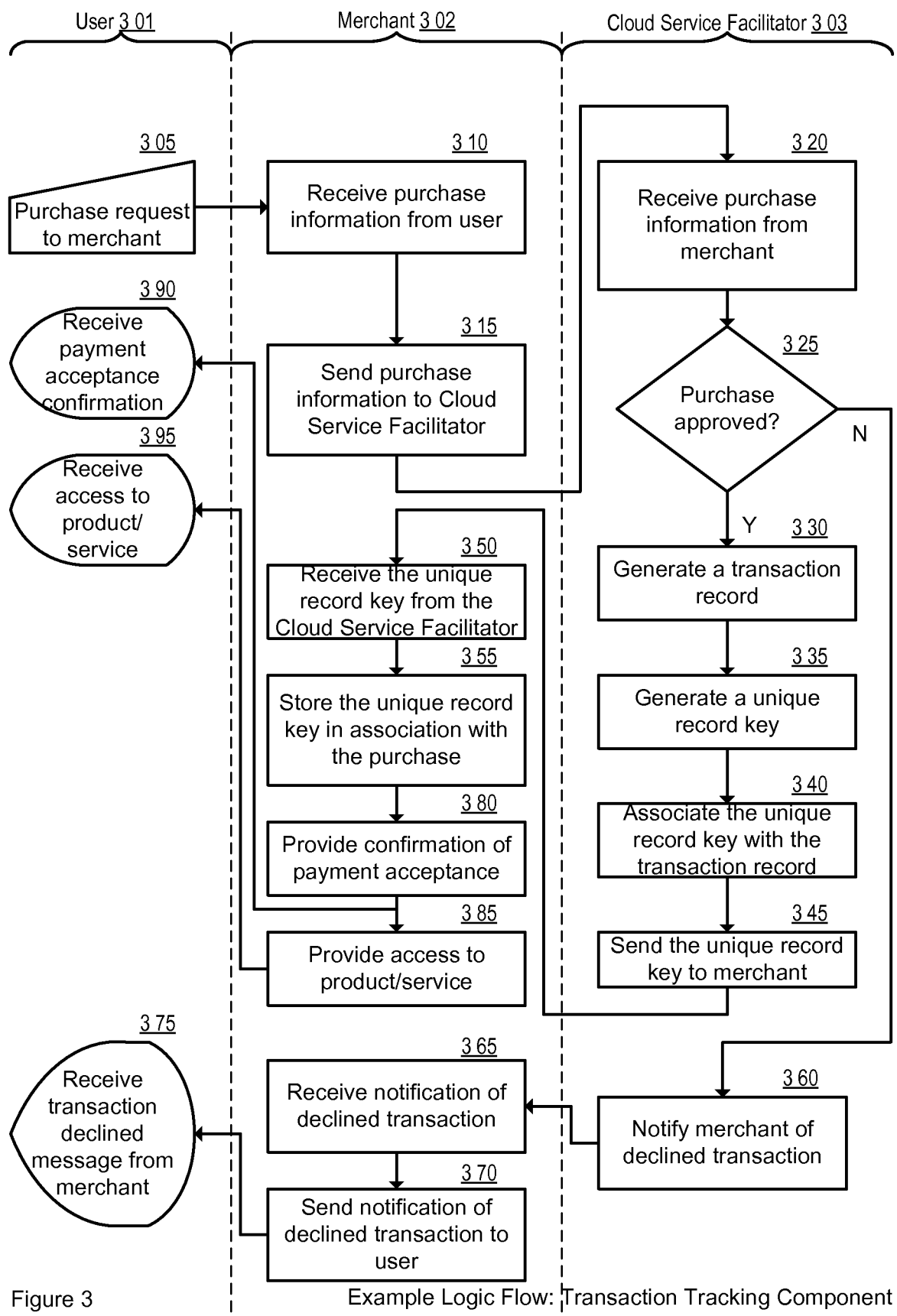
FIG. 3 shows a logic flow diagram illustrating example transaction tracking component (TTC) in some embodiments of the CSF.

FIG. 3 shows a logic flow diagram illustrating example transaction tracking component (TTC) in some embodiments of the CSF. In one embodiment, the transaction tracking component includes flow of information between a user 301, a merchant 302 and a cloud service facilitator 303. At 305, the user may place a request to purchase a product or service from the merchant. After receiving the user's purchase request including product information, account information, payment information, and/or the like at 310, the merchant may forward the received purchase related information to the CSF at 315. In one implementation, the merchant may transmit the purchase request to a payment gateway for transaction processing. The payment gateway may send an authorization request to the payment processing network or interchange for authorization. The CSF may receive the purchase related information at 320, and in one implementation, may independently verify whether the purchase was approved at 325 by the issuer. Verification of transaction authorization may be obtained directly from the payment processing network, the payment gateway, the issuer or the acquirer in some implementations.

In an alternate embodiment, only transactions that are authorized are forwarded to the CSF for record keeping such that there is no need for the CSF to verify or check the status (e.g., approved or denied) of the transaction. In yet another embodiment, the merchant may directly communicate with the CSF via a CSF API. The merchant may send the purchase information to the CSF at 315 and the CSF may receive the purchase information at 320. In one implementation, the CSF may independently verify the status of the transaction (e.g., approved or declined) with the payment processing network/interchange at 325. If the purchase transaction is authorized at 325, the CSF may generate a transaction record at 330 using the information extracted from the purchase related information obtained from the merchant. In some implementations, more than one product/service may be purchased in a single transaction. In such a situation, a transaction record may be generated for each unique product/service purchase. At 335, the CSF may generate a unique key for each transaction record created at 330. In one implementation, the transaction record may contain information fields such as user ID, product or service ID, unique key, purchase date, session date/time, session length, and/or the like. In some implementations, the unique key may be a hash of parameters such as product information, user information, merchant information, payment information, and/or the like. In other implementations, the unique key may be a randomly generated string. At 340, the CSF may associate the unique record key with the transaction record, and store the transaction record and associated key in one or more databases and/or tables. At 345, the CSF may send the unique key to the merchant. After receiving the unique key at 350, the merchant may store the key in association with the purchased product/service at 355. The merchant may also provide the user confirmation of payment acceptance at 380 which may be displayed to the user at 390. In one implementation, the merchant may also provide the user information relating to access to the purchased product/service at 385 which may be rendered for display at 395.

At 325, if the purchase transaction is declined, the CSF may send a notification 360 to the merchant indicating the declined status of the transaction. At 365, the merchant may receive the notification and may alert the user of the declined transaction at 370. The user may receive the declined transaction message via his or her client device at 375. In some implementations, the notification regarding the declined transaction authorization may be routed through the payment gateway, the acquirer and the merchant to the user.

In some embodiments, the creation of a transaction record associated with a unique key at the CSF allows the CSF to track transactions and keep records such that the CSF can provide users and merchants refund, account and analytics facilities of the CSF in other embodiments. For example, usage tracking feature may be useful to cloud product/service merchants (e.g., OnLive) that may sell "cloud gaming" products/services over broadband internet and consumers who purchase such products/services. For instance, a user may purchase or gain membership access to a cloud gaming service. After gaining access to the cloud gaming service, the user may purchase a game (e.g., Halo). However, after a period of time, the user may not find the game worthwhile and may consider returning the game for a refund. Aspects of the CSF may facilitate processing, determination and/or provisioning of any residual value of the game/purchase.

Figure 4:
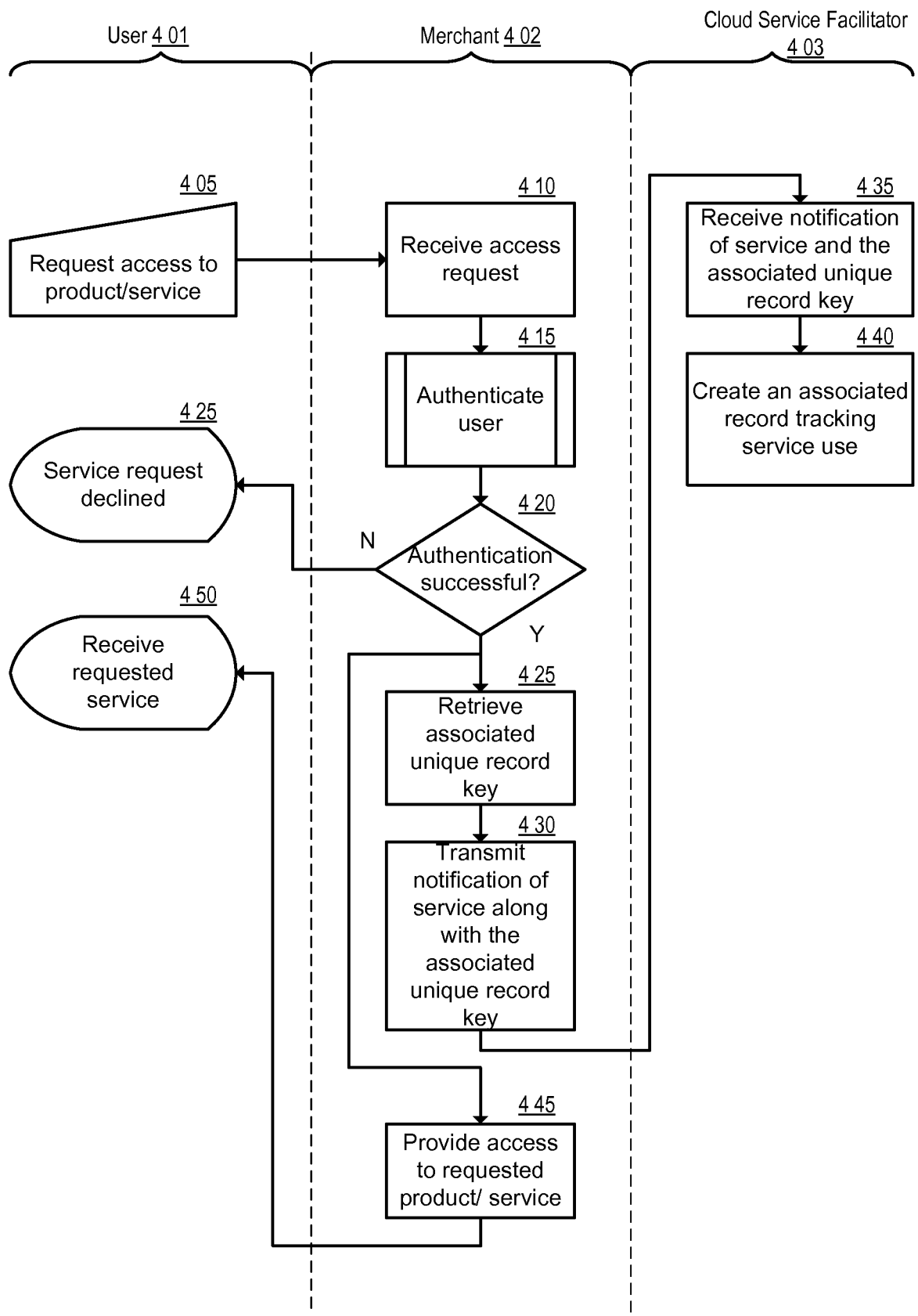
FIG. 4 shows a logic flow diagram illustrating example usage tracking component (UTC) in some embodiments of the CSF.

FIG. 4 shows a logic flow diagram illustrating example usage tracking component (UTC) in some embodiments of the CSF. In one embodiment, the usage tracking component involves flow of information between a user 401, a merchant 402 and the CSF 403. For example, at 405, the user may request access to a product or service from the merchant 402. The access request may include, for example, a request to use a cloud product/service previously purchased by the user 401. In some implementations, the product or service may be provided by the merchant over the internet. At 410, the merchant 402 may receive the access request. The merchant 402 may then initiate an authentication process at 415 to determine that the user 401 is in fact authorized to use the requested service. For example, the merchant may compare the user_ID and password provided by the user in the access request against the user_ID and password on file in one or more merchant databases. In some implementations, the merchant may also confirm the geographical location (e.g., from IP address) or client device (e.g., device ID, device type, etc.). If the authentication is not successful at 420, the user 401 may receive an access request declined message from the merchant 402. If the authentication is successful at 420, the merchant 402 may provide the user access to the requested product/service at 445. The user 401 may then receive the requested product/service from the merchant 402 or merchant controlled remote servers at 450.

In one embodiment, the merchant 402 may query one or more merchant databases using information such as user_ID, product, ID, and/or the like to obtain a transaction record corresponding to the user 401 and the requested product/service. In another implementation, the query may be used to obtain the unique key associated with the query parameters at 425. In one embodiment, the merchant database may be relational database responsive to Structured Query Language ("SQL") commands. The merchant server may execute a hyptertext preprocessor ("PHP") script including SQL commands to query the database for unique record key. An example PHP/SQL command listing, illustrating substantive aspects of querying the database is provided below:

```
<?PHP
header('Content-Type:text/plain');
mysql_connect("254.93.179.111",$DBserver,$password);
    //access database server
mysql_select_db("MERCHANT_DB.SQL");//select database table
to search
//create query
$query = "SELECT recordkey FROM TransactionRecordTable
WHERE user_ID LIKE '%' $user_ID AND product_ID LIKE '%'
$product_ID";
$result = mysql_query($query);//perform the search query
mysql_close("MERCHANT_DB.SQL");//close database access
```

At 430, the unique key may be transmitted, along with a notification of product/service provisioning, to the CSF 403. The CSF 403 may receive the notification and the unique key from the merchant at 435. In one implementation, at 440, the CSF may query one or more CSF databases and/or tables (e.g., usage database 212*d*) to look up a usage record corresponding to the unique key and update the usage record with the indication of user's product/service usage. If there is no usage record for the unique key, the CSF may create a usage record and store the received usage information in the created usage record. In one implementation, the merchant 402 may pass information such as session_ID, session start time, session end time, and/or the like to the CSF 403. As each instance of usage of a product/service by a user is reported, the CSF can independently track and log usage of product/services over a period of time.

Figure 5:
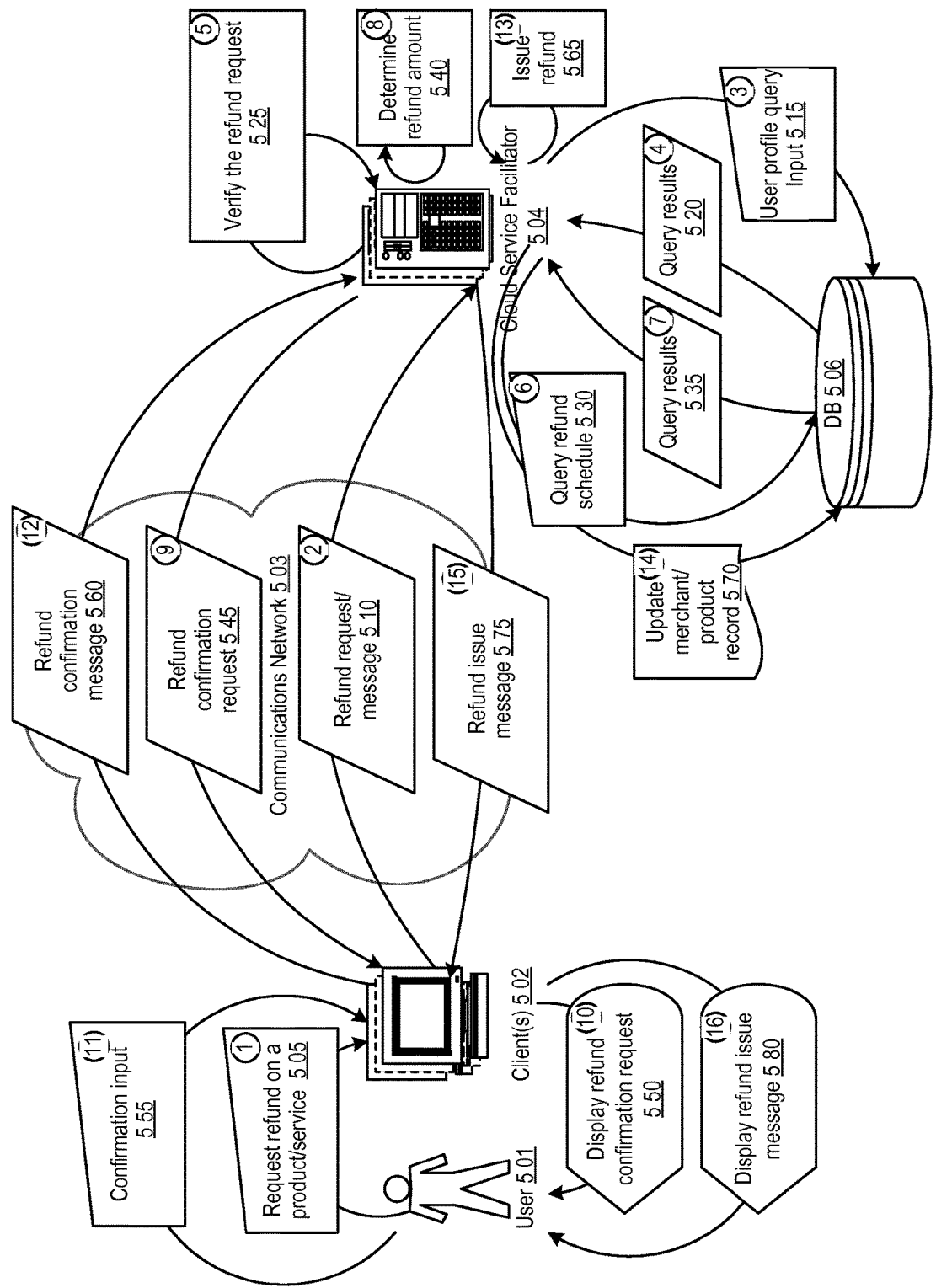
FIG. 5 shows a data flow diagram illustrating example refund request in some embodiments of the CSF.

Factoring in usage tracking in the calculation of any refund to users has several advantages. For example, the same refund calculation formula is applied consistently to all users, giving all users a fair chance to obtain a refund that is rightfully due. Furthermore, as users know the process in which refunds are determined, there is no room for misunderstanding between merchants and consumers regarding the expected amount of refund. FIG. 5 shows a data flow diagram illustrating example refund request in some embodiments of the CSF. In one embodiment, a user 501 may place a request 505 (see FIG. 1B for detail) for a refund on a product or service purchased from a merchant using a client device 502. The client device may take the user's request and generate a refund request message 510 that is sent to the CSF server 504 via a communications network 503. The refund request message 510 may include information such as product/service ID or name, merchant ID or name, original payment identifier, user ID, other verifying information, and/or the like. An exemplary refund request message 510, substantially in the form of a HTTP(S) POST message including XML-formatted data, is provided below:

```
POST /refundprocessing.php HTTP/1.1
Host: www.refundprocessor.com
Content-Type: Application/XML
Content-Length: 667
<?XML version = "1.0" encoding = "UTF-8"?>
<refund_request>
    <merchant_name>Bill's Games</merchant_name>
    <product_ID>AE95049324</product_ID>
  <account_params>
    <account_name>Jon Doe</account_name>
    <account_type>credit</account_type>
    <account_num>4455897067567654</account_num>
    <expire_date>05-2015</expire_date>
    <CVV_code>455</CVV_code>
    <billing_address>700 Corona St., Corvalis, OR 972004</billing_address>
   </account_params>
</refund_request>
```

After receiving the refund request message, the CSF may parse the message to extract user and/or product details. At 520, using the extracted details, the CSF may verify that the refund request is valid. In one implementation, the CSF may provide a user profile query input 515 to one or more CSF databases and/or tables 506 (e.g., purchase database 212*a*, account database 212*b*, merchant database 212*c*, etc.). In one implementation, the user profile query input may include the extracted pieces of information and the query results 520 may include the unique record key associated with the user and the product/service being returned and/or other information (e.g., merchant ID). An example PHP/SQL command listing, illustrating substantive aspects of querying the database is provided below:

```
<?PHP
header('Content-Type:text/plain');
mysql_connect("254.93.179.111",$DBserver,$password);
    //access database server
mysql_select_db("PURCHASE_DB.SQL");//select database table
to search
//create query
$query = "SELECT recordkey FROM PurchaseTable WHERE user_ID
LIKE '%' $user_ID AND product_ID LIKE '%' $product_ID";
$result = mysql_query($query);//perform the search query
mysql_close("PURCHASE_DB.SQL");//close database access
```

Obtaining an associated record key may in some implementations act as verification 525 of the refund request as a legitimate request. The CSF server may, in one implementation, input a refund schedule query 530 to a database 506 (e.g., refund database). The refund schedule query may be created using, for example, a merchant ID in one implementation. The refund schedule query 530 may return a refund schedule corresponding to the merchant as a query result 535; the schedule may hold tabular results of refund schedule as discussed in FIG. 705. In another embodiment, the CSF refund schedule component of FIG. 7 may be employed on demand rather than using the refund schedule component to pre-populate a database table 506, thereby obviating the need for queries 530, 535 and instead obtaining such results 535 directly from the refund schedule component of FIG. 7. In some implementations, merchants may sell products from various categories. For example, some products may be very expensive, while others may be relatively inexpensive. Similarly, some products may have a long life, while others may not. As such, in some implementations, merchants may establish separate refund schedules depending on product type. In such situations, the record key may be used to query a refund database to search for a refund schedule that matches the product/service in question. In one implementation, the CSF server may retrieve the matching refund schedule from the database 506. The CSF server may then use the procedure outlined in the refund schedule to determine the refund amount at 540. In some implementations, the refund schedule may identify the rules, models and/or formulas that may be used to calculate the refund amount. Details of the refund calculation processes are discussed with reference to FIGS. 6 and 7.

After calculating the refund amount, the CFS may generate and send a refund confirmation request 545 to the client. In one implementation, the refund confirmation request 545 may be rendered by the client device and displayed to the user at 550 as shown in the UI 130 of FIG. 1B. The user may provide a confirmation input 555 to the client device, which may generate a refund confirmation message 560 for transmission to the CSF server. After receiving confirmation from the user, the CSF may issue the refund to the requesting user at 565. In one implementation, the calculated refund amount may be credited to the user's original form of tender. In another implementation, the calculated refund amount may be credited to one or more payment devices or accounts including e-wallet accounts selected by the user. In yet another implementation, a pre-paid card (e.g., Visa prepaid card, a gift card, Visa credit, etc.) having a value of the calculated refund amount may be issued to the user. In one implementation, the CSF server may also update the merchant/product records 570 in one or more databases and/or tables (e.g., database 506). It should be noted that the product record may have a product category type associated with the product which may be used by the CSF for later determining risk of refund for specific product, product category, and/or the like (e.g., FIGS. 8B-14). In some implementations, the CSF server may send a refund issue message 575 to the client device of the user. The refund issue message 575 may be in the form of an SMS or MMS, email, push notification, web page confirmation, in app notification, and/or the like. In a further implementation, the refund is issued in substantially real-time and/or on-demand from the user such that the user can instantly see the refund issue message rendered on the client device at 580.

Figure 6:
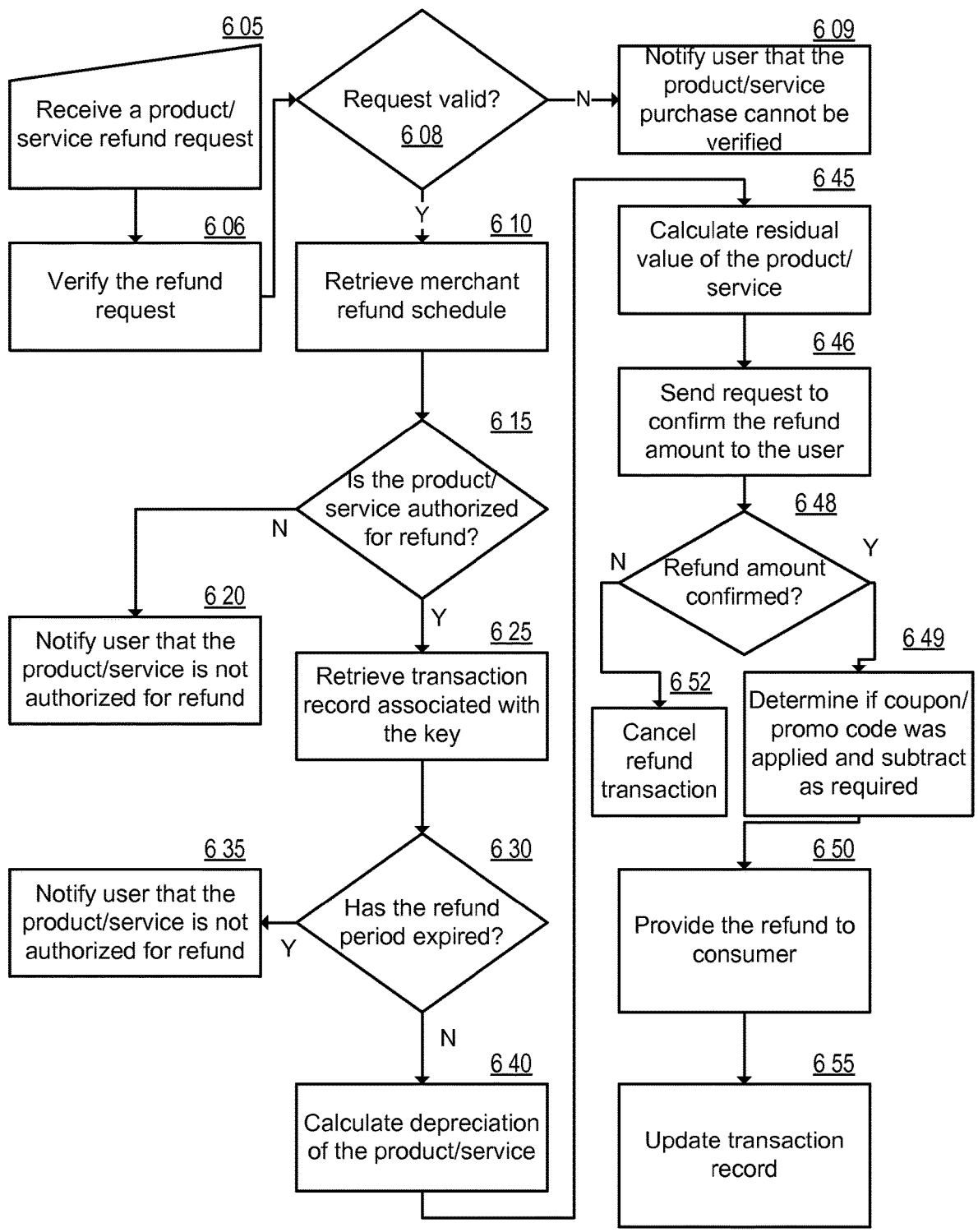
FIG. 6 shows a logic flow diagram illustrating example refund request processing component (UTC) in some embodiments of the CSF.

FIG. 6 shows a logic flow diagram illustrating example refund request processing component (UTC) in some embodiments of the CSF. In one embodiment, the CSF may receive a product/service refund request at 605. The product/service refund request may be initiated by a user and forwarded to the CSF by the merchant in one implementation. In this implementation, the merchant may include the unique record key associated with the product/service in question. In another implementation, the user may send the refund request directly to the CSF. When the user bypasses the merchant and establishes direct contact with the CSF, the user can remain anonymous from the merchant. In this implementation, the refund request may include user identifying information such as name, address, product/service ID, payment identifier, and/or the like by which the CSF may verify the refund request as a valid refund request at 606. In one implementation, the verification process may include querying one or more CSF databases and/or tables to obtain a purchase record matching the record key and/or user provided information. When a purchase record is not found, the relationship between the user and the merchant cannot be verified, and a refund cannot be issued. If the request is determined to be invalid at 608, the CSF may notify the user and/or the merchant that the product/service purchase cannot be verified at 609. The user and/or the merchant may try again by supplying the correct information or may escalate the issue for a detailed evaluation.

On the other hand, if the refund request is determined to be a valid request at 608, the CSF may retrieve a refund schedule associated with the purchase record at 610. In one embodiment, the refund schedule may include information such as refund eligibility criteria, expiration date, depreciation rate, and/or the like. Alternate embodiments of the refund schedule and/or refund determination components are discussed with respect to FIGS. 7 and 8A-B. At 615, using the retrieved refund schedule, the CSF may determine whether the product or service in question is authorized for refund. In one implementation, the determination may be based on merchant product/service refund criteria from the merchant refund schedule. For example, a user may pay a monthly subscription to a cloud product/service such as a gaming membership. One week into the paid month, the user may not like the product/service and may want to cancel the subscription and request a refund. However, the merchant criteria in the refund schedule may indicate that subscription type products/services are non-refundable and the user's request for a refund may be denied. The user may be notified of the declined refund at 620.

If the product/service is authorized for refund, a transaction record corresponding to the record key may be retrieved at 625. A determination may be made at 630 to ascertain if the refund period has expired. For example, the refund schedule may specify that a product/service purchased more than a year before the refund request date may not be eligible for refund because the refund period may be limited to 3 months after the purchase date. If the refund period has expired, the user may be sent a notification of declined refund at 635. On the other hand, if the refund period has not expired, the CSF may obtain a depreciation rate associated with the product/service from the refund schedule to calculate depreciation of the product/service at 640. In one implementation, depreciation of the product/service may be time based. For example, the product or service that initially cost $100 may depreciate to $50 within three months. In another implementation, depreciation may be usage based. For example, a product/service that is used at least 10 times may depreciate 100%. Based on the depreciation, a residual value of the product/service may be calculated at 645. In one pseudo Python code implementation, an example calculation of depreciation and residual value may be as follows:

```
#1 /usr/bin/env python
usage_var1 = 5
max_usage_var2 = 10
price = 400
if usage_var1<max_usage_var2
    dep_val = usage_var1*price/max_usage_var2
    res_val = price-dep_val
else:
    res_val = 0
```

At 646, the CSF may send a request to confirm the refund amount to the user. If the user does not confirm the refund amount at 648, the refund transaction may be canceled at 652. However, if the user confirms acceptance of the refund amount, at 649, the CSF may determine if a coupon/promo code was applied and if so, the applied amount may be subtracted as required. At 650, the CSF may provide the residual value as a refund amount to the user initiating the product/service refund request. In one implementation, the refund amount may be credited to the user's original form of tender or a payment device selected by the user. In another implementation, a pre-paid card may be issued having a value of the refund amount. At 655, the purchase record may be updated to reflect the issuance of the refund to the user.

Figure 7:
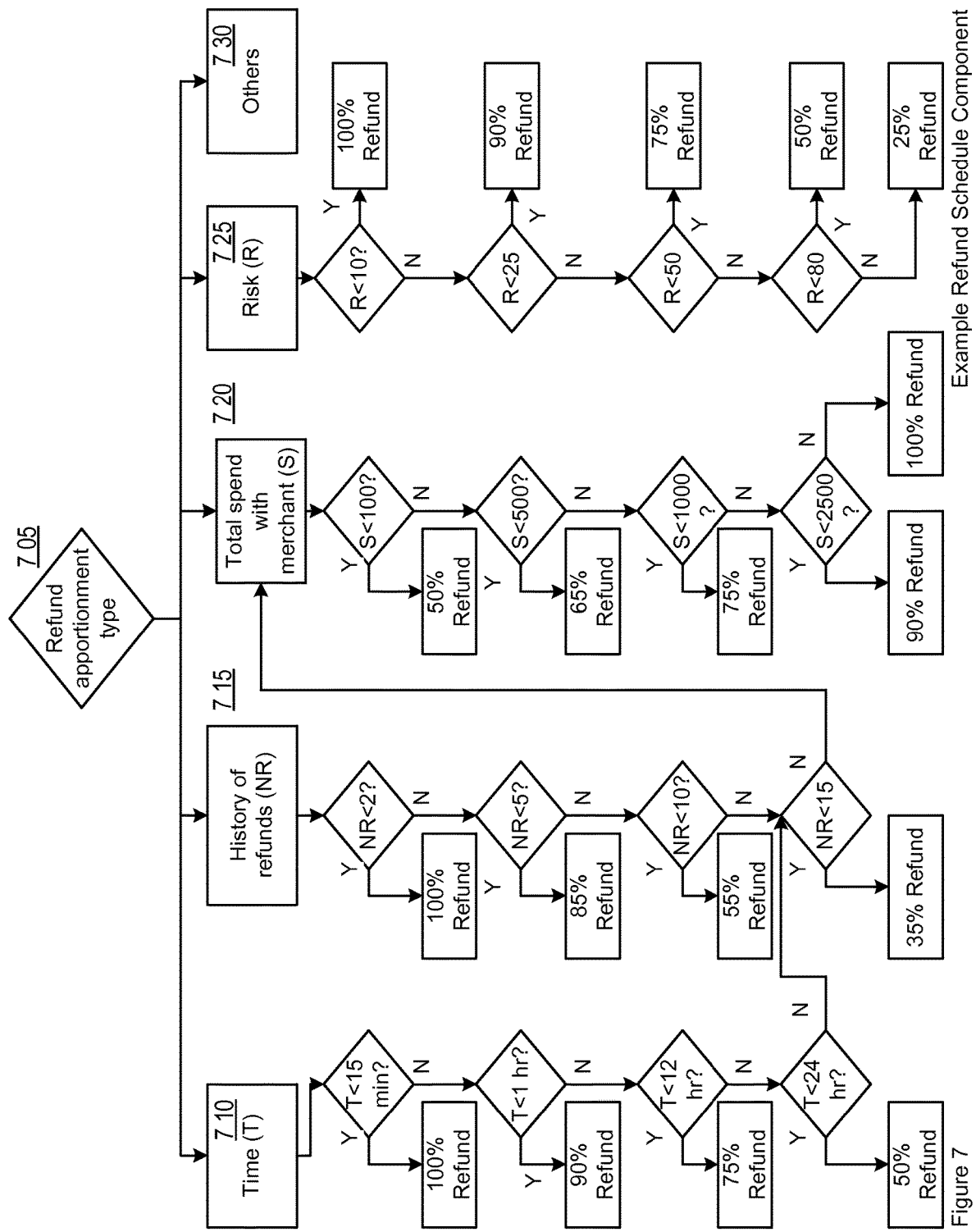
FIG. 7 shows a logic flow diagram illustrating example refund schedule component in some embodiments of the CSF.

FIG. 7 shows a logic flow diagram illustrating example refund schedule in some embodiments of the CSF. In some embodiments, a refund schedule may identify a list of refund apportionment types and associated thresholds. For example, in one implementation, the CSF may determine the refund apportionment type a merchant may wish to use at 705. In one implementation, examples of refund apportionment type include, without limitation, time (T) 710, history of refunds (NR) 715, total spend (S) 720, risk (R) 725 and others 730. For each apportionment type one or more thresholds may be set. For example, referring to time 710, 100% of the purchase price is refunded if the refund is initiated within 15 minutes from the time of purchase. Similarly, the refund is 90% if T is within 15 minutes to 1 hour, 75% if T is within 1 hour and 12 hours and 50% if T is within 12 to 24 hours. In one implementation, other apportionment types may be selected for further determination of refund amount. For example, when the refund is initiated after 24 hours, the CSF may consider a second apportionment type condition where if the number of returns over a period of time (NR) is less than 15, the user may obtain a 35% refund. In some implementations, the refund schedule may specify additional conditions such as T>24 and N>15 and S>2500 to arrive at 100% refund.

FIG. 8A shows a graphical diagram illustrating example variation of refund with time and/or usage in some embodiments of the CSF. In one implementation, refund (as a percentage of the purchase price) may vary exponentially with time and/or usage. For example, the refund may exponentially decay to 0% with time and/or usage (e.g., frequency and/or session length). An example refund function that exponentially decays with time, usage, and time and usage may be represented as: $Ae^{-a1 \times time}$, $Be^{-b1 \times usage}$ and $Abe^{-(a1 \times time + b1 \times usage)}$ respectively. In some embodiments of the CSF, % refund may not vary exponentially, but in another form such as linear, quadratic, polynomial, and/or the like. In one implementation, the steepness of the decaying exponential curve may vary for different risk levels, e.g., levels 1-4. In one implementation, each risk level may correspond to a range of risk score values associated with a user, a merchant or both. For example, if a risk score ranges anywhere from a low of 0 to a high of 99, a risk level 1 may encompass all risk scores within 99-79, a risk level 2 may encompass all risk scores within 59-78, a risk level 3 may encompass all risk scores within 39-58, and a risk level 4 may encompass all risk scores within 0-38. Other risk score ranges and as well as risk level classification are contemplated in other implementations of the CSF. Calculation of the risk score is discussed in detail with respectful to FIGS. 9-11 and 12A-C.

FIG. 8B shows a graphical diagram illustrating example variation of refund with time/usage in some embodiments of the CSF. In one embodiment of the CSF, the relationship between % refund and time and/or usage may not be characterized as continuous, but as discrete as shown by the step function. For example, in one implementation, the step function may be defined such that for a range of time/usage values between 0 and $x_1$, $x_1$ and $x_2$, $x_2$ and $x_3$, $x_3$ and $x_4$ and greater than $x_4$, the % refund value is a constant at 100%, 80%, 70%, 20% and 0% respectively. In one implementation, risk may also vary with % refund in a similar fashion. The ranges of % refund and time/usage/risk discussed are exemplary, and other variations of the ranges are contemplated in other implementations of the CSF.

In some embodiments, the CSF may leverage its facilities, functionalities and relationship with merchants and consumers to provide insurance on cloud products/services. The CSF insurance may provide consumers protection against merchant fraud. For example, a consumer may purchase a smart phone application that may require a connection to a service. If the service becomes defunct, the consumer has no easy way of requesting a refund. Instead, the consumer may need to call customer service, fill out forms, go through an approval process, etc., all of which may take a significant amount of time as well as cause irritation to consumers. In many cases, calling the customer service may also not be an option. The CSF may provide consumers a means of requesting refund even when the service is discontinued or is defunct, or the merchant is out of business. In one implementation, the consumer may request the CSF for a refund. The CSF may verify that the service is in fact defunct or the merchant is out of business. Verification of the consumer information may be carried out to prevent fraudulent requests. Upon verification, the CSF may calculate depreciation, determine a residual value and provide the residual value to the consumer via one of the plurality of payment devices such as credit and debit cards, pre-paid cards, statement credit and/or the like. In another implementation, the CSF may utilize threshold rules and/or refund types stored in one or more tables and/or databases to determine whether the consumer is authorized for a refund and if authorized, the type of refund that would be provided. In a further implementation, the threshold rules when triggered may specify refund types (e.g., no refund, 10% of purchase price refund, etc.). Triggers for threshold rules may be based on time criteria (products purchased 1 month before, 2 months before, etc.), price criteria (e.g., $100-$200, >$500, $1000, etc.), product type criteria (e.g., enterprise software, gaming software, storage space, etc.), usage criteria, consumer spend with merchant, risk criteria and/or the like. For instance, when a consumer attempts to return a product/service bought more than three months before, the threshold rule related to timing criteria (e.g., purchase period 3 months) may be triggered. The CSF may then access a refund type (e.g., qualified for refund 40% of original purchase price) corresponding to the triggered threshold rule.

In one embodiment, merchants may purchase insurance for product/service refunds from the CSF. Insurance is an agreement where the insurer (e.g., CSF) agrees to pay to the beneficiary (e.g., user) a defined amount in the event of a loss (e.g., refund) in exchange for a stipulated payment called premium. When merchants purchase the refund insurance from the CSF in exchange for a premium, customers of the merchant (i.e., users) may directly contact CSF for refunds, even when the product/service is defunct or the merchant goes out of business. The refund insurance gives customers of the merchant the confidence to trust the merchant and purchase products/services from the merchant without any fear of risk. For example, users may be hesitant to buy from a merchant that is new to the market, or has a product/service that is not well reviewed. However, if the same merchant is enrolled in the refund insurance, the merchant can guarantee the customers refund in case they are not fully satisfied with the product/service. Such a guarantee may directly benefit the merchant by presenting the merchant as a trusted entity, and encouraging the customers to purchase from the merchant. Such a guarantee may also prevent the customers from being victims of fraudulent merchants.

The insurance premium that a merchant pays to the CSF in exchange for the CSF's refunding services may be calculated in a number of ways in various embodiments of the CSF. For example, in some embodiments, the premium is calculated based on specialized models, while in others the premium may be calculated based on statistical historical information. Exemplary premium calculation components of the CSF are discussed in detail with respect to FIGS. 9-11.

FIG. 9 shows a logic flow diagram illustrating example refund insurance premium calculation (RIPC-1) component in some embodiments of the CSF. In one implementation, the calculation may start at 905, the CSF may receive from the merchant a request for refund insurance coverage at 910. In response to the request, the CSF may request the merchant to provide additional information on one or more risk factors such as merchant life (e.g., number of years the merchant has been in business), product life range (e.g., how long products have been in the market), revenue from product sale, product price range, products for insurance coverage, customer rating of products/merchant, number of returns for each product, and/or the like. The CSF may obtain information on one or more of the risk factors listed above from the merchant at 915. In one implementation, the CSF, while processing refund transactions of insured merchants, may collect data relating to risk factors. In a further implementation, the CSF may build a correlation model for each risk factor, such as one shown in FIG. 12B, using the historical data. At 920, the CSF may update the correlation models to include the new set of risk factor data obtained from the merchant. In one implementation, the correlation model may correlate each risk factor to a probability such as a probability of a refund request. Using data points from a number of merchants, a trend line relating probability to risk factor may be obtained. The CSF may then use the relationship between the two variables to determine, for a given risk factor value, to determine the probability of a refund at 925. At 930, the CSF may assign risk weights to each risk factor. In one implementation, the risk weights may be pre-defined for each risk factor. In another implementation, the risk weights may be tailored based on the probability. For example, the risk factor that corresponds to the highest probability may be assigned a higher weight.

At 935, the CSF may calculate a refund risk score for the merchant using the determined probability and risk factor weights. An example refund risk score calculation is shown below.

```
#1 /usr/bin/env python
risk_factor1_p = 0.7
risk_factor1_wt = .1
risk_factor2_p = 0.3
risk_factor2_wt = 0.3
risk_factor3_p = 0.7
risk_factor3_wt = 0.3
risk_factor4_p = 0.4
risk_factor4_wt = 0.3
refund_risk_score = 100*((risk_factor1_p*risk_factor1_wt) +
```

(risk_factor2_p*risk_factor2_wt) +
(risk_factor3_p*risk_factor3_wt) +
(risk_factor4_p*risk_factor4_wt))

At 940, the CSF may determine merchant risk level. In one implementation, the merchant risk level may help determine whether a merchant is uninsurable, and if insurable, the level of risk in insuring the merchant. In one implementation, assuming a normal distribution of refund risk scores for a sample of merchants (FIG. 12A), a refund risk score that is within 2 standard deviations from the mean may be classified as a standard risk to CSF. Similarly, a refund risk score may be classified as very low risk, low risk, high risk, very high risk and uninsurable. Using the distribution of the refund risk scores, the CSF may determine the refund risk level at 940. If the refund risk level is determined to be uninsurable at 945, the CSF may deny the merchant's request for insurance coverage at 950. In some implementations, the CSF may re-evaluate coverage for the merchant after a period of time. At 955, after determining that the merchant is insurable, the CSF may determine the risk level and the premium factor corresponding to the risk level. In one implementation, the premium factor may be an additional premium (beyond the net premium) charged to the merchant to help pay for expenses relating to insurance policies and processing, cover any unanticipated refund payments, to manage risk that is higher than the standard risk, and/or the like. In one implementation, the insurance premium may be calculated as a product of the weighted probability and exposure. In one implementation, exposure is the loss the CSF would experience if the merchant went out of business or products are returned for returned. For example, exposure may be equivalent to the cost of an average or median number of refund transactions in the preceding time period. At 958, the CSF may determine the exposure associated with the merchant. At 960, the CSF may calculate the insurance premium for the merchant as a product of the weighted probability and exposure. At 965, the calculated insurance premium may be provided to the merchant for acceptance before concluding the calculation at 970.

Figure 10:
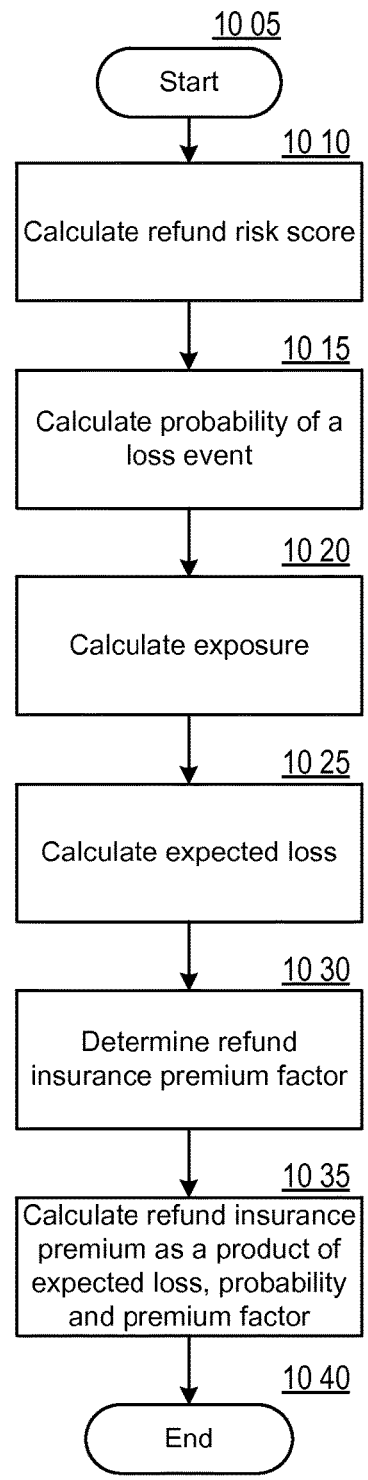
FIG. 10 shows a logic flow diagram illustrating example refund insurance premium calculation (RIPC-2) component in some embodiments of the CSF.

FIG. 10 shows a logic flow diagram illustrating an example refund insurance premium calculation (MIPC-2) component in some embodiments of the CSF. Starting at 1005, the CSF may calculate a refund risk score at 1010. In some implementations, the refund risk score may be calculated by the procedure outlined in FIG. 9. At 1015, the CSF may calculate probability of a default event. Examples of a default event may include the merchant going out of business, the merchant being fraudulent, and/or the like. In some implementations, a correlation model such as the one in FIG. 12C may be established using historical data. Using the correlation mode, the probability for a calculated refund risk score may be determined. At 1020, the exposure from the default may be determined. At 1025, the CSF may calculate the expected loss as a product of the probability and the exposure. At 1030, the CSF may determine the premium factor from the risk score distribution such as the one in FIG. 12A. At 1035, the CSF may calculate the gross premium as a product of the expected loss and the premium factor. The calculation may conclude at 1040.

FIG. 11 shows a logic flow diagram illustrating example refund insurance premium evaluation (RIPE) component in some embodiments of the CSF. Starting at 1105, after the merchant accepts the terms and conditions, including the refund insurance premium, the CSF may enroll the merchant in the insurance coverage at 1110. In one implementation, the merchant may be provided a merchant ID and one or more records may be created in one or more databases and/or tables. At 1115, the CSF may process various refund transactions, originating from the merchant's customers. At 1120, the CSF may, as a part of a periodic evaluation, evaluate the refund risk factors for the merchant. For example, the CSF may examine data collected since the last evaluation or enrollment, update correlation models, re-calculate risk scores, and/or the like. At 1125, the CSF may determine whether the risk score and/or level changed from the previous values. In one implementation, the percent change from the previous level may be required to be greater than a defined percent change. If there is no change, the CSF may keep the previously calculated premiums and continue processing refund transactions. If, however, there is a change in the risk score or level, the CSF may recalculate the refund insurance premium at 1130 and provide the adjusted premium to the merchant. At 1140, if the merchant accepts the insurance premium change, the CSF may affect the adjustment at 1145 and return to processing refund transactions at 1115. If the merchant does not accept the adjusted insurance premium, the CSF may terminate the insurance coverage and conclude the processing at 1155.

In one embodiment, aspects of the analytics engine (e.g., 1510) of the CSF may provide analytics services. In one implementation, an advertisement ("ad") campaign effectiveness assessment may be made using the analytics services of the CSF. For example, merchants A and B may have an agreement with the CSF for ad effectiveness tracking. Merchant A may implement an ad campaign where an ad of a game X is displayed to consumers. The CSF may track consumer purchases of the game X across multiple channels. For example, purchases at merchant A and merchant B may be tracked to provide campaign effectiveness metric to merchant A and/or B. In one implementation, the campaign effectiveness metric may be a ratio of number of purchases over a number of unique product exposures. In a further implementation, the CSF may track credit card purchases (e.g., purchases with Visa branded credit cards) to determine purchases at merchants A and/or B to determine ad and/or offer campaign effectiveness.

Figure 14A:
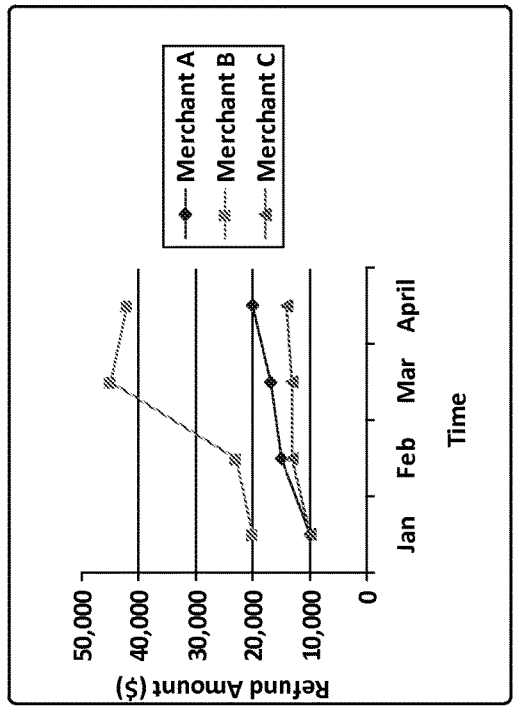
FIGS. 14A, 14B, 14C, and 14D show graphical diagrams illustrating example analytics reporting in some embodiments of the CSF.
Figure 14B:
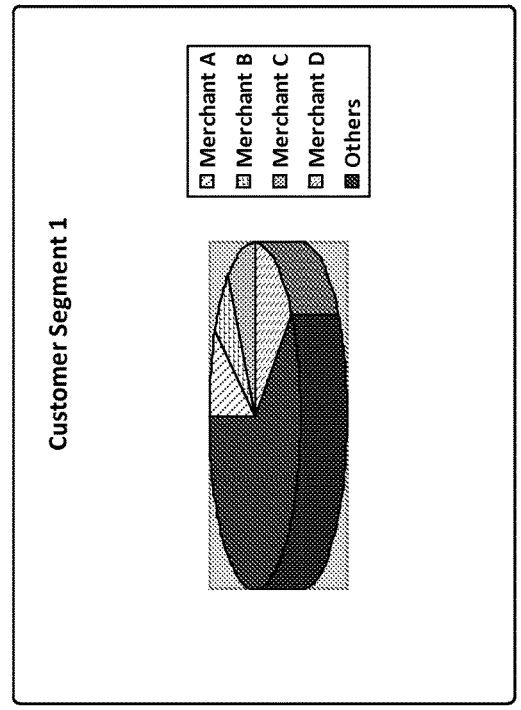

FIG. 13 shows a logic flow diagram illustrating example analytics collection component in some embodiments of the CSF. Starting at 1305, the CSF may obtain purchase and/or usage information from the merchant at 1310. The CSF may parse the obtained information to extract purchase and/or usage parameters at 1315. Example parameters that may be extracted include, for example, user_ID, SKU, ad_ID, merchant_ID, channel source, record key, and/or the like. In one implementation, the extracted parameters may be stored in various databases at 1340. At 1320, the CSF may query one or more databases and/or tables to look up an associated advertisement campaign or offer campaign. In one implementation, the CSF may use, for example, SKU data to look up an ad or offer campaigns matching the product SKU or product category. At 1325, the CSF may determine whether there is at least one associated campaign. If there is an associated active campaign, the CSF may update the associated campaign parameters at 1330. For example, when the CSF receives a purchase record information which includes the products purchased, the channel where the purchase was initiated, and an indication of advertisement or offer display, the CSF may track each indication of purchase, not only from the merchant, but also other merchants, and correlate the purchases with advertisement views or offer displays. An example analytics reporting graph correlating ad views over time for various merchants is shown in FIG. 14A. When there are no associated active campaigns, the process may conclude at 1335.

Figure 14C:
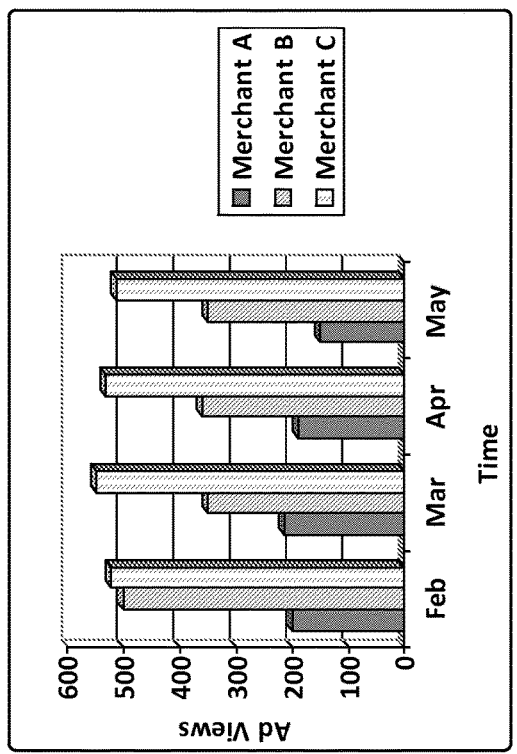
Figure 14D:
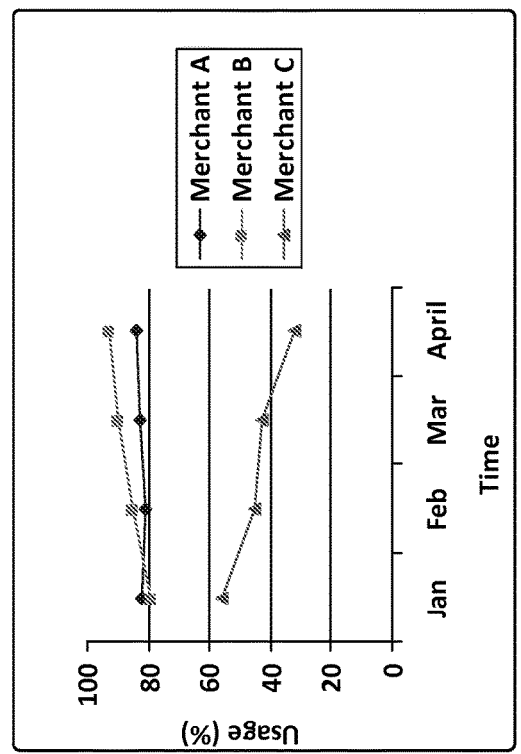

In one implementation, the CSF may aggregate purchase and usage data for various products/services from multiple channels. For example, the CSF may track product/service usage and customer retention for merchants. For example, merchant A and B's customer usage for product/service may be monitored to provide merchant A and/or B data for customer product/service usage at merchant A relative to similar product/service at merchant B. Similarly, customer retention at merchants A and B may be monitored to provide merchants A and/or B customer retention at merchant A for a product/service relative to similar product/service at merchant B. An example analytics reporting graph for usage over time for various merchants is shown in FIG. 14C.

In another implementation of the CSF, real time consumer scores may be determined based on transaction information and/or consumer behavior. For example, using historical transaction data, the CSF may identify consumers who exhibit risky behavior such as repeated refund requests, or consumers who exhibit desired behavior such as high spend, and may quantitatively characterize such consumers by calculating risk scores. In one implementation, the risk score may be a function of instances of risk factors such as refunds, instances of retention, product/service value, length of customer patronage, and/or the like. In a further implementation, the risk score may be a weight sum of the risk factors. In another implementation, the product/service transaction history data may be employed to determine probability of customer retention and fraud risk. In a further implementation, the consumer scores may be used to determine offers, rewards, promotions and/or upgrades. Similarly, indications of probability of customer retention may assist merchants in identifying consumers for providing incentives, offers, rewards and/or the like. In yet another implementation, the consumer scores may be utilized to segment consumers into different clusters (e.g., FIG. 14D). Such segmentation may assist merchants in understanding consumer needs and interest as well as targeting advertisements to suitable consumer segments. In one implementation, tracking of refund transaction data over time for various merchants (e.g., FIG. 14B) may provide indication of the refund risk associated with the merchant.

Consumer feedback is always invaluable to merchants in trying to understand market interests and increase revenue. While consumer feedback for a particular product/service from a particular merchant is useful, consumer feedback that is weighted by that consumer's reviews of other products/services may be particularly useful in discerning quality feedback from non-quality feedback.

In one implementation, the CSF may include report generation facilities that generate various reports (e.g., FIGS. 14A-D) on analytics such as usage, retention, ad effectiveness and other metrics at an on demand or periodic basis. The CSF may also generate reports, for example, on a monthly basis reports on refunds, offer redemptions, upgrades and/or product replacements for the merchant. Such reports, in one implementation, may be used by the CSF and the merchant for disbursements and/or accounting settlement purposes.

In another embodiment, aspects of the CSF may be leveraged for providing account services. The CSF may, for instance, track products/services for replacement if the device in which the product/service was installed is lost or destroyed. For example, a user may lose his/her smart phone having one or more cloud products/services installed therein. In such a case, the user may contact the CSF (e.g., by website, email, toll-free number, application interface, etc.) and provide an identifier (e.g., credit card number). The CSF may query its databases to verify that a corresponding transaction record exists. The CSF may further verify that the user is indeed authorized to use all or requested products/services. In one implementation, the verified information may be relayed to the merchant from where the user may download previously purchased products/services at no cost to his or her new or replacement device. The CSF may in another implementation assist in providing product/service upgrades. For example, a merchant may provide a list of products/services with available upgrades to the CSF. In response, the CSF may determine which users are authorized for free upgrades, no upgrades, upgrades at a discount or upgrades at a regular price. In some instances, the CSF may utilize consumer risk scores to determine which users should be given discounts or upgrades. In one embodiment, the CSF may provide services that allow multiple users to access a product/service with one license. For example, a business may buy a group license for an HR product/service for its Human Resources department employees. Although each user may be provided his or her own individual login information, all the login information may be tied to a single unique record key. Usage by all the authorized users may be tracked by the CSF using the unique record key. The CSF, in another embodiment, may limit terms of service violations such as re-selling of virtual goods. Users who have purchased products/services can easily share or sell their login information to other users. However, because the CSF has a stored transaction record containing payment identifier, a user is less likely to engage in activities that violate terms of service agreements. In yet another embodiment, aspects of the CSF may limit customers from pretending to be new customers to receive new or enhanced offers. Since a new customer may be required to provide purchase information including a payment identifier, the CSF may verify that there is no associated transaction record for the new customer before authorizing any offers.

FIG. 15 shows a block diagram illustrating example components in some embodiments of the CSF. In one embodiment, client devices such as 1532a-f may communicate with the CSF interface 1525 via a communications network 1530. The CSF interface may be in communication with the identification engine 1510, the analytics engine 1515 and the reporting engine 1520. Each of these engines may be coupled to a data store 1504 that may include a number of databases and/or tables (e.g., 1502a, 1502b). These engines may include facilities for processing, for example, transaction tracking component 1641, usage tracking component 1642, refund determination component 1643, refund schedule component 1644, RIPC-1 component 1645, RIPC-2 component 1646, RIPE component 1647, analytics collection component 1648, and/or the like.

CSF Controller

Figure 16:
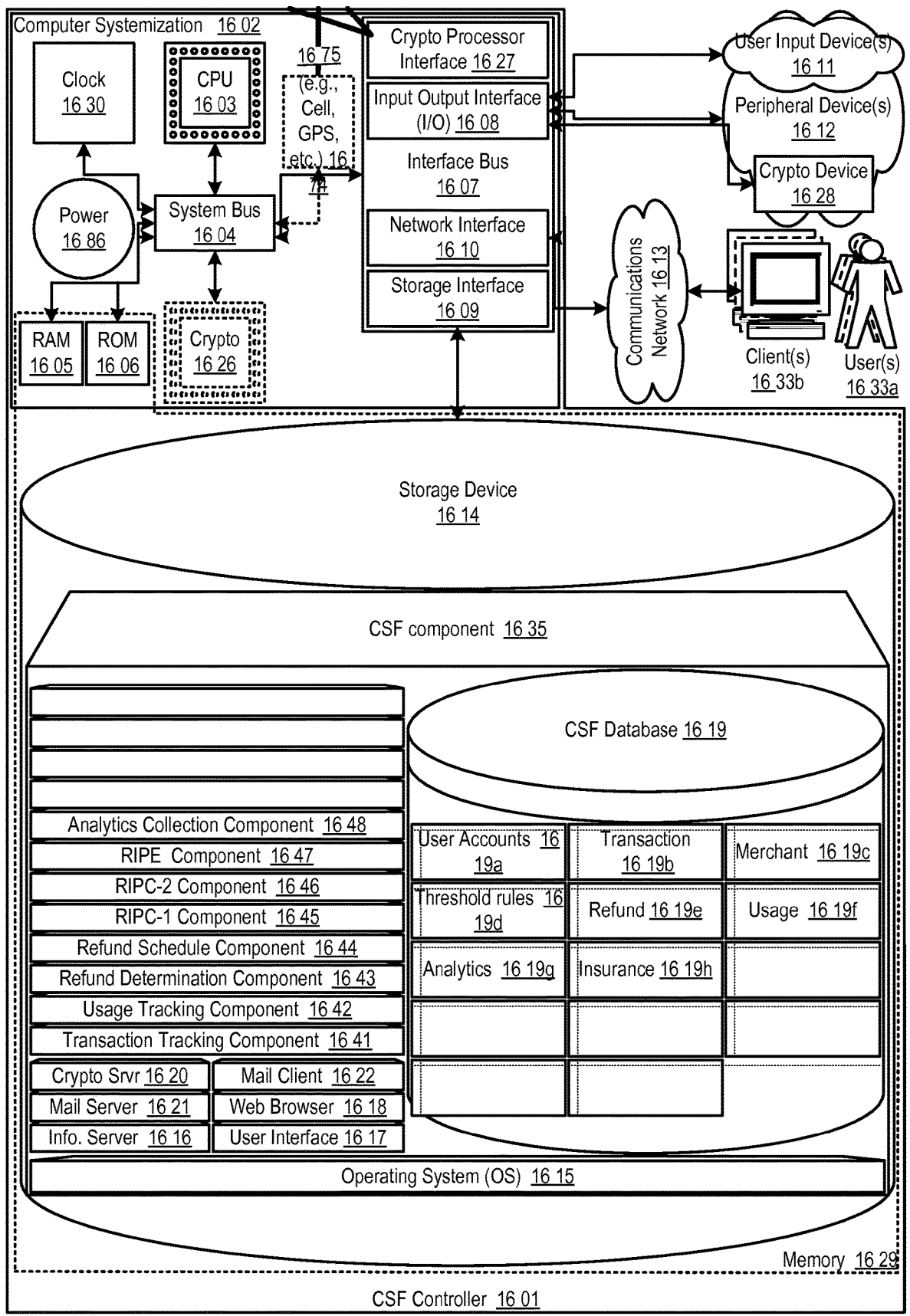
FIG. 16 shows a block diagram illustrating embodiments of a CSF controller.

FIG. 16 shows a block diagram illustrating embodiments of a CSF controller. In this embodiment, the CSF controller 1601 may serve to aggregate, process, store, search, serve, identify, instruct, generate, match, and/or facilitate interactions with a computer through cloud service facilitation technologies, and/or other related data.

Typically, users, which may be people and/or other systems, may engage information technology systems (e.g., computers) to facilitate information processing. In turn, computers employ processors to process information; such processors 1603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CSF controller 1601 may be connected to and/or communicate with entities such as, but not limited to: one or more users from user input devices 1611; peripheral devices 1612; an optional cryptographic processor device 1628; and/or a communications network 1613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CSF controller 1601 may be based on computer systems that may comprise, but are not limited to, components such as: a computer systemization 1602 connected to memory 1629.

Computer Systemization

A computer systemization 1602 may comprise a clock 1630, central processing unit ("CPU(s)" and/or "processor(s)" (these terms are used interchangeable throughout the disclosure unless noted to the contrary)) 1603, a memory 1629 (e.g., a read only memory (ROM) 1606, a random access memory (RAM) 1605, etc.), and/or an interface bus 1607, and most frequently, although not necessarily, are all interconnected and/or communicating through a system bus 1604 on one or more (mother)board(s) 1602 having conductive and/or otherwise transportive circuit pathways through which instructions (e.g., binary encoded signals) may travel to effectuate communications, operations, storage, etc. The computer systemization may be connected to a power source 1686; e.g., optionally the power source may be internal. Optionally, a cryptographic processor 1626 and/or transceivers (e.g., ICs) 1674 may be connected to the system bus. In another embodiment, the cryptographic processor and/or transceivers may be connected as either internal and/or external peripheral devices 1612 via the interface bus I/O. In turn, the transceivers may be connected to antenna(s) 1675, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing CSF controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the CSF controller and beyond through various interfaces. Should processing requirements dictate a greater amount speed and/or capacity, distributed processors (e.g., DistributedCSF), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the CSF may be achieved by implementing a microcontroller such as CAST's R8051XC2 microcontroller; Intel's MCS 51 (i.e., 8051 microcontroller); and/or the like. Also, to implement certain features of the CSF, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CSF component collection (distributed or otherwise) and/or features may be implemented via the microprocessor and/or via embedded components; e.g., via ASIC, coprocessor, DSP, FPGA, and/or the like. Alternately, some implementations of the CSF may be implemented with embedded components that are configured and used to achieve a variety of features or signal processing.

Depending on the particular implementation, the embedded components may include software solutions, hardware solutions, and/or some combination of both hardware/software solutions. For example, CSF features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the CSF features. A hierarchy of programmable interconnects allow logic blocks to be interconnected as needed by the CSF system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the CSF may be developed on regular FPGAs and then migrated into a fixed version that more resembles ASIC implementations. Alternate or coordinating implementations may migrate CSF controller features to a final ASIC instead of or in addition to FPGAs. Depending on the implementation all of the aforementioned embedded components and microprocessors may be considered the "CPU" and/or "processor" for the CSF.

Power Source

The power source 1686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1686 is connected to at least one of the interconnected subsequent components of the CSF thereby providing an electric current to all subsequent components. In one example, the power source 1686 is connected to the system bus component 1604. In an alternative embodiment, an outside power source 1686 is provided through a connection across the VO 1608 interface. For example, a USB and/or IEEE 1394 connection carries both data and power across the connection and is therefore a suitable source of power.

Interface Adapters

Interface bus(ses) 1607 may accept, connect, and/or communicate to a number of interface adapters, conventionally although not necessarily in the form of adapter cards, such as but not limited to: input output interfaces (I/O) 1608, storage interfaces 1609, network interfaces 1610, and/or the like. Optionally, cryptographic processor interfaces 1627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1609 may accept, communicate, and/or connect to a number of storage devices such as, but not limited to: storage devices 1614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Through a communications network 1613, the CSF controller is accessible through remote clients 1633b (e.g., computers with web browsers) by users 1633a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CSF), architectures may similarly be employed to pool, load balance, and/or otherwise increase the communicative bandwidth required by the CSF controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (I/O) 1608 may accept, communicate, and/or connect to user input devices 1611, peripheral devices 1612, cryptographic processor devices 1628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1611 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1612 may be connected and/or communicate to I/O and/or other facilities of the like such as network interfaces, storage interfaces, directly to the interface bus, system bus, the CPU, and/or the like. Peripheral devices may be external, internal and/or part of the CSF controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CSF controller may be embodied as an embedded, dedicated, and/or monitor-less (i.e., headless) device, wherein access would be provided over a network interface connection.

Cryptographic units such as, but not limited to, microcontrollers, processors 1626, interfaces 1627, and/or devices 1628 may be attached, and/or communicate with the CSF controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the CSF controller and/or a computer systemization may employ various forms of memory 1629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1629 will include ROM 1606, RAM 1605, and a storage device 1614. A storage device 1614 may be any conventional computer system storage. Storage devices may include a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1629 may contain a collection of program and/or database components and/or data such as, but not limited to: operating system component(s) 1615 (operating system); information server component(s) 1616 (information server); user interface component(s) 1617 (user interface); Web browser component(s) 1618 (Web browser); database(s) 1619; mail server component(s) 1621; mail client component(s) 1622; cryptographic server component(s) 1620 (cryptographic server); the CSF component(s) 1635; and/or the like (i.e., collectively a component collection). These components may be stored and accessed from the storage devices and/or from storage devices accessible through an interface bus. Although non-conventional program components such as those in the component collection, typically, are stored in a local storage device 1614, they may also be loaded and/or stored in memory such as: peripheral devices, RAM, remote storage facilities through a communications network, ROM, various forms of memory, and/or the like.

Operating System

The operating system component 1615 is an executable program component facilitating the operation of the CSF controller. Typically, the operating system facilitates access of VO, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CSF controller to communicate with other entities through a communications network 1613. Various communication protocols may be used by the CSF controller as a subcarrier transport mechanism for interaction, such as, but not limited to: multicast, TCP/IP, UDP, unicast, and/or the like.

Information Server

An information server component 1616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CSF controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CSF database 1619, operating systems, other program components, user interfaces, Web browsers, and/or the like.

Access to the CSF database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CSF. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CSF as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1618 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CSF enabled nodes. The combined application may be nugatory on systems employing standard Web browsers.

Mail Server

A mail server component 1621 is a stored program component that is executed by a CPU 1603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CSF.

Access to the CSF mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1622 is a stored program component that is executed by a CPU 1603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1620 is a stored program component that is executed by a CPU 1603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CSF may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the CSF component to engage in secure transactions if so desired. The cryptographic component facilitates the secure accessing of resources on the CSF and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CSF Database

The CSF database component 1619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CSF database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CSF database is implemented as a data-structure, the use of the CSF database 1619 may be integrated into another component such as the CSF component 1635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1619 includes several tables 1619*a-h*. An Account table 1619*a* may support and/or track multiple entity accounts on a CSF and includes fields such as, but not limited to: user ID, password, account name, account type, account number, expire date, CVV code, billing address, shipping address, email, phone, unique record key, user rating/risk score and/or the like. A Transaction table 1619*b* includes fields such as, but not limited to: user ID, unique record key, product/service ID, purchase price, current price, usage date, usage time, usage tally, maximum usage, depreciation rate, refund status, residual value, checkout ID, time stamp, referral site, promo code, promo discount and/or the like. A Merchant table 1619*c* includes fields such as, but not limited to: merchant ID, product/service ID, merchant location, merchant rating/risk score, account ID, unique record key and/or the like. A Threshold rules table 1619*d* includes fields such as, but not limited to: threshold criteria ID, threshold value, rule ID, rule schedule ID, unique record ID, merchant ID and/or the like. A Refund Type table 1619*e* includes fields such as, but not limited to: rule ID, refund ID, refund value, offer ID, purchase price, product/service ID, and/or the like. A Usage Table 1619*f* includes fields such as, but not limited to: report ID, unique record key, time stamp, session ID, start, end, session length, product ID, product name, client IP, client type, user ID, and/or the like. An Analytics Table 1619*g* includes fields such as, but not limited to: user ID, merchant ID, record key, ad ID, offer ID, customer segment ID, refund value, usage, risk level, risk score, probability, and/or the like. An Insurance Table 1619*h* includes fields such as, but not limited to: user ID, merchant ID, product ID, risk factor ID, rule schedule ID, risk score, premium, risk level, premium multiplier, coverage start date, coverage end date, and/or the like.

In one embodiment, the CSF database may interact with other database systems. For example, employing a distributed database system, queries and data access by search CSF component may treat the combination of the CSF database, an integrated data security layer database as a single database entity.

In one embodiment, user programs may contain various user interface primitives, which may serve to update the CSF. Also, various accounts may require custom database tables depending upon the environments and the types of clients the CSF may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1619*a-h*. The CSF may be configured to keep track of various settings, inputs, and parameters via database controllers.

The CSF database may communicate to and/or with other components in a component collection, including itself, and/or facilities of the like. Most frequently, the CSF database communicates with the CSF component, other program components, and/or the like. The database may contain, retain, and provide information regarding other nodes and data.

The CSFs

The CSF component 1635 is a stored program component that is executed by a CPU. In one embodiment, the CSF component incorporates any and/or all combinations of the aspects of the CSF that was discussed in the previous figures. As such, the CSF affects accessing, obtaining and the provision of information, services, transactions, and/or the like across various communications networks.

The CSF transforms product/service selection, access request, refund request 505, etc., inputs via CSF components transaction tracking component 1641, refund determination component 1643, etc., into purchase request 220, authorization request 225, authorization response 230, purchase record information 235, store purchase information 245, account information 250, merchant information 252, unique record identifier 255, product/service message 265, access request 274, access authorization 276, refund request message 510, refund issue confirmation message 555, etc., outputs.

The CSF component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the CSF server employs a cryptographic server to encrypt and decrypt communications. The CSF component may communicate to and/or with other components in a component collection, including itself, and/or facilities of the like. Most frequently, the CSF component communicates with the CSF database, operating systems, other program components, and/or the like. The CSF may contain, communicate, generate, obtain, and/or provide program component, system, user, and/or data communications, requests, and/or responses.

Distributed CSFs

The structure and/or operation of any of the CSF node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CSF controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CSF controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header ('Content-Type: text/plain');
// set ip address and port to listen to for incoming data
$address = '192.168.0.100';
$port = 255;
// create a server-side SSL socket, listen for/accept
incoming communication
$sock = socket_create(AF_INET, SOCK_STREAM, 0);
socket_bind($sock, $address, $port) or die('Could not bind
to address');
socket_listen($sock);
$client = socket_accept($sock);
// read input data from client device in 1024 byte blocks
until end of message
do {
$input = "";
$input = socket_read($client, 1024);
$data .= $input;
1 while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
VALUES ($data)"); // add data to UserTable table in a
```

-continued

```
CLIENT database
mysql_close("CLIENT_DB.SQL"); // close connection to
database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for CLOUD SERVICE FACILITATOR APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure.

As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CSF individual and/or enterprise user, database configuration and/or relational model, data type, data transmission and/or network framework, syntax structure, and/or the like, various embodiments of the CSF, may be implemented that enable a great deal of flexibility and customization. For example, aspects of the CSF may be adapted for providing consumer services, account services and analytics services. While various embodiments and discussions of the CSF have been directed to cloud products and services, however, it is to be understood that the embodiments described herein may be readily configured and/or customized for a wide variety of other applications and/or implementations.

The invention claimed is:

1. A processor-implemented method of refund apportionment, comprising:
    receiving, via a processor at a cloud service facilitator (CSF) server and from a merchant server that provisioned a cloud-based product or service to a user computing device:
        a unique purchase record key that corresponds to the cloud-based product or service and the user computing device, and
        a notification that indicates provisioning of the cloud-based product or service to the user computing device;
    determining an independent record of successive usage sessions of the cloud-based product or service by the user computing device to account for each successive usage session of the cloud-based product or service by the user computing device since receiving the notifications by:
        receiving a usage reporting message that includes the unique purchase record key that corresponds to the cloud-based product or service and a session length for a usage session of the cloud-based product or service by the user computing device,
        extracting the session length from the usage reporting message, and
        create the independent record of successive usage sessions of the cloud-based product or service by the user computing device since receiving the notification based on the extracted session length from the usage reporting message;
    receiving, via a processor at the CSF server, an application store user refund request for an application store purchase of the cloud-based product or service, the application store refund request received from the user computing device, wherein the application store refund request includes the unique purchase record key;
    retrieving, via a processor and using the unique purchase record key, both of:
        threshold refund rules for the application store purchase, and
        the independent record of successive usage sessions of the cloud-based product or service, wherein the threshold refund rules specify a variation of refund based on the independent record of successive usage sessions of the cloud-based product or service; and
    determining, via a processor, using the threshold refund rules and the independent record of successive usage sessions of the cloud-based product or service, an amount of the refund.

2. The method of claim 1, further comprising receiving via a processor at the cloud service facilitator (CSF) server and from the merchant server that provisioned the cloud-based product or service, a provisioning notice from the merchant server, the provisioning notice including the notification that indicates provisioning of the cloud-based product or service to the user computing device.

3. The method of claim 2, wherein the provisioning notice indicates download of the cloud-based product or service from the merchant server to the user computing device.

4. The method of claim 3, wherein determining the amount of the refund includes calculating depreciation of the of the cloud-based product or service based on one or more of the independent record of successive usage sessions of the cloud-based product or service and the provisioning notice.

5. The method of claim 3, further comprising receiving the application store refund request from the user computing device via the merchant server.

6. The method of claim 5, wherein determining the independent record of successive usage sessions of the cloud-based product or service by the user computing device since receiving the notification based on the extracted session length from the usage reporting message includes further comprises storing one or more of session ID, session start time, and session end time for each use of the cloud-based product or service.

7. The method of claim 6, further comprising verifying the application store user refund request using the unique purchase key.

8. A refund apportionment apparatus, comprising:
    a memory;
    a processor disposed in communication with said memory, and configured to issue a plurality of processing instructions stored in the memory, wherein the processor issues instructions to:
        receive a unique purchase record key that corresponds to the cloud-based product or service and the user computing device;
        receive a notification that indicates provisioning of the cloud-based product or service to the user computing device;
        determine an independent record of successive usage sessions of the cloud-based product or service by the user computing device to account for each successive usage session of the cloud-based product or service by the user computing device since receiving the notification by issuing further instructions to:
            receive a usage reporting message that includes the unique purchase record key that corresponds to the cloud-based product or service and a session length for a usage session of the cloud-based product or service by the user computing device,
            extract the session length from the usage reporting message, and
            create the independent record of successive usage sessions of the cloud-based product or service by the user computing device since receiving the notification based on the extracted session length from the usage reporting message;

receive an application store user refund request for an application store purchase of the cloud-based product or service, the application store refund request received from the user computing device, wherein the application store refund request includes the unique purchase record key;

retrieve, using the unique purchase record key, both of:
threshold refund rules for the application store purchase, and
the independent record of successive usage sessions of the cloud-based product or service, wherein the threshold refund rules specify a variation of refund based on the independent record of successive usage sessions of the cloud-based product or service;

determine, using the threshold refund rules and the independent record of successive usage sessions of the cloud-based product or service, an amount of the refund;

send a refund confirmation request to the user computing device, the refund confirmation request including at least a portion of the independent record of successive usage sessions of the cloud-based product or service; and upon receiving a confirmation input from the user computing device in response to the refund confirmation request, issue the refund to the user computing device.

9. The apparatus of claim 8, wherein the processor issues further instructions to receive a provisioning notice from a merchant server, wherein the provisioning notice indicates provision of the cloud-based product or service from the merchant server to the user computing device.

10. The apparatus of claim 9, wherein the instruction to determine the amount of the refund includes calculating depreciation of the of the cloud-based product or service based on one or more of the independent record of successive usage sessions of the cloud-based product or service and the provisioning notice.

11. The apparatus of claim 10, wherein the processor issues further instructions to receive the application store refund request from the user computing device via the merchant server.

12. The apparatus of claim 11, wherein the instructions to determine the independent record of successive usage sessions of the cloud-based product or service by the user computing device since receiving the notification based on the extracted session length from the usage reporting message includes instructions to store one or more of session ID, session start time, and session end time for each use of the cloud-based product or service.

13. The apparatus of claim 12, wherein the processor issues further instructions to verify the application store user refund request using the unique purchase key.

14. A non-transitory, processor-readable medium storing processor-issuable instructions to:

receive a unique purchase record key that corresponds to the cloud-based product or service and the user computing device;

receive a notification that indicates provisioning of the cloud-based product or service to the user computing device;

determine an independent record of successive usage sessions of the cloud-based product or service by the user computing device to account for each successive usage session of the cloud-based product or service by the user computing device since receiving the notification with further processor-issuable instructions to:
receive a usage reporting message that includes the unique purchase record key that corresponds to the cloud-based product or service and a session length for a usage session of the cloud-based product or service by the user computing device,
extract the session length from the usage reporting message, and
create the independent record of successive usage sessions of the cloud-based product or service by the user computing device since receiving the notification based on the extracted session length from the usage reporting message;

receive an application store user refund request for an application store purchase of the cloud-based product or service, the application store refund request received from the user computing device, wherein the application store refund request includes the unique purchase record key;

retrieve, using the unique purchase record key, both of:
threshold refund rules for the application store purchase, and
the independent record of successive usage sessions of the cloud-based product or service,
wherein the threshold refund rules specify a variation of refund based on the independent record of successive usage sessions of the cloud-based product or service, and determine, using the threshold refund rules and the independent record of successive usage sessions of the cloud-based product or service, an amount of the refund.

15. The non-transitory, processor-readable medium of claim 14, wherein the instruction to determine the amount of the refund includes calculating depreciation of the of the cloud-based product or service based on one or more of the usage record and the provisioning notice.

16. The non-transitory, processor-readable medium of claim 14, storing further processor-issuable instructions to verify the application store user refund request using the unique purchase key.

* * * * *